US012166232B2

(12) United States Patent
Suenaga et al.

(10) Patent No.: US 12,166,232 B2
(45) Date of Patent: Dec. 10, 2024

(54) BATTERY CASE, VEHICLE COMPRISING SAID BATTERY CASE, AND STATIONARY TYPE POWER STORAGE DEVICE

(71) Applicant: AESC Japan Ltd., Kanagawa (JP)

(72) Inventors: Masanori Suenaga, Kanagawa (JP); Yasukazu Iwasaki, Kanagawa (JP); Shuuto Kikuchi, Kanagawa (JP)

(73) Assignee: AESC Japan Ltd., Kanagawa (JP)

( * ) Notice: Subject to any disclaimer, the term of this patent is extended or adjusted under 35 U.S.C. 154(b) by 625 days.

(21) Appl. No.: 17/295,192

(22) PCT Filed: Mar. 20, 2019

(86) PCT No.: PCT/JP2019/011918
§ 371 (c)(1),
(2) Date: May 19, 2021

(87) PCT Pub. No.: WO2020/110333
PCT Pub. Date: Jun. 4, 2020

(65) Prior Publication Data
US 2022/0013852 A1    Jan. 13, 2022

(30) Foreign Application Priority Data

Nov. 27, 2018   (JP) .................. 2018-221534

(51) Int. Cl.
*H01M 50/325*   (2021.01)
*H01M 50/209*   (2021.01)
*H01M 50/262*   (2021.01)

(52) U.S. Cl.
CPC ....... *H01M 50/325* (2021.01); *H01M 50/209* (2021.01); *H01M 50/262* (2021.01); *H01M 2220/10* (2013.01); *H01M 2220/20* (2013.01)

(58) Field of Classification Search
CPC .......... H01M 50/325; H01M 2220/10; H01M 2220/20
See application file for complete search history.

(56) References Cited

U.S. PATENT DOCUMENTS

2018/0261872 A1   9/2018   Satoh

FOREIGN PATENT DOCUMENTS

| DE | 102007063191 A1 | 6/2009 |
|---|---|---|
| JP | 2015-22997 A | 2/2015 |
| JP | 5803553 B2 | 11/2015 |
| WO | 2017/060942 A1 | 4/2017 |

OTHER PUBLICATIONS

International Search Report issued in corresponding International Patent Application No. PCT/JP2019/011918 dated May 21, 2019.

*Primary Examiner* — Wyatt P Mcconnell
(74) *Attorney, Agent, or Firm* — Morgan, Lewis & Bockius LLP

(57) ABSTRACT

When the pressure in the battery case is increased, the gas discharge flow rate is secured sufficiently. This battery case (30) is a battery case in which a battery (2) is housed in a housing (10). The battery case (30) includes a gas discharge mechanism (G). The gas discharge mechanism (G) includes a gas discharge port (51) that opens in a wall plate (43) that covers a periphery of the housing (10), and a lid part (35m). The lid part (35m) is disposed to cover the gas discharge port (51) from inside the wall plate (43), and is fixed on the housing (10) side.

20 Claims, 19 Drawing Sheets

FIG. 1
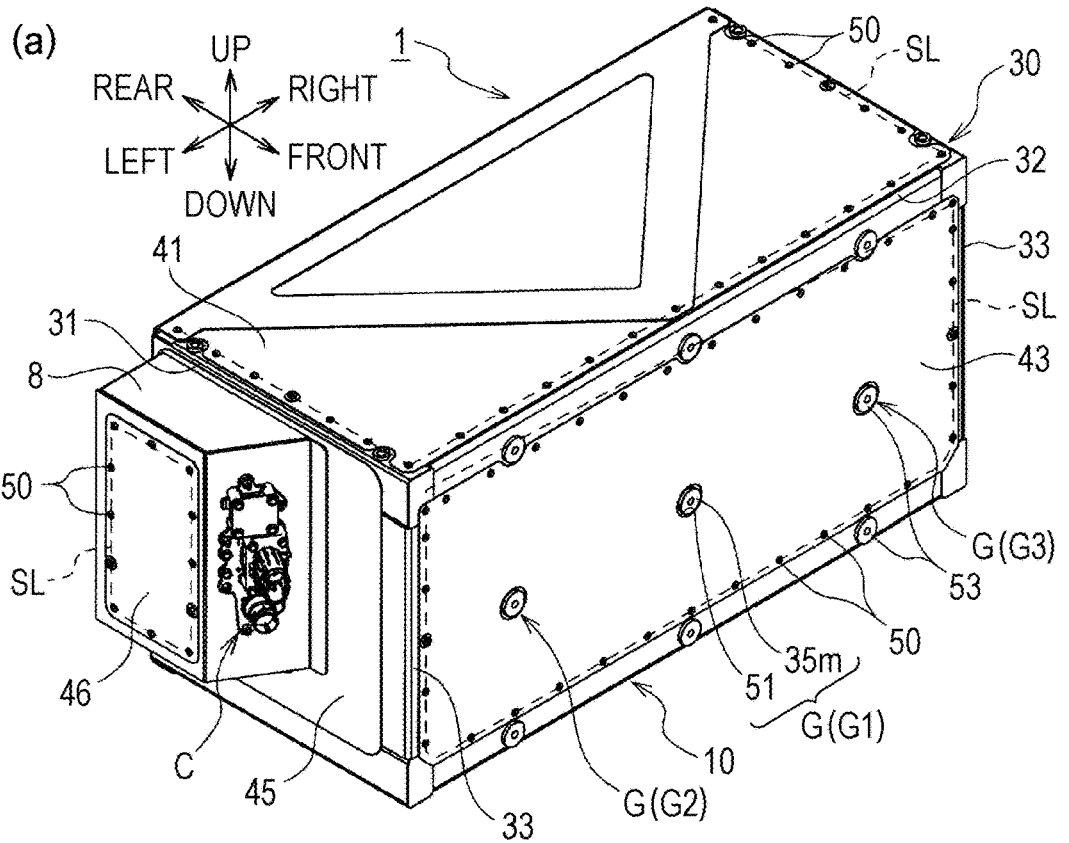
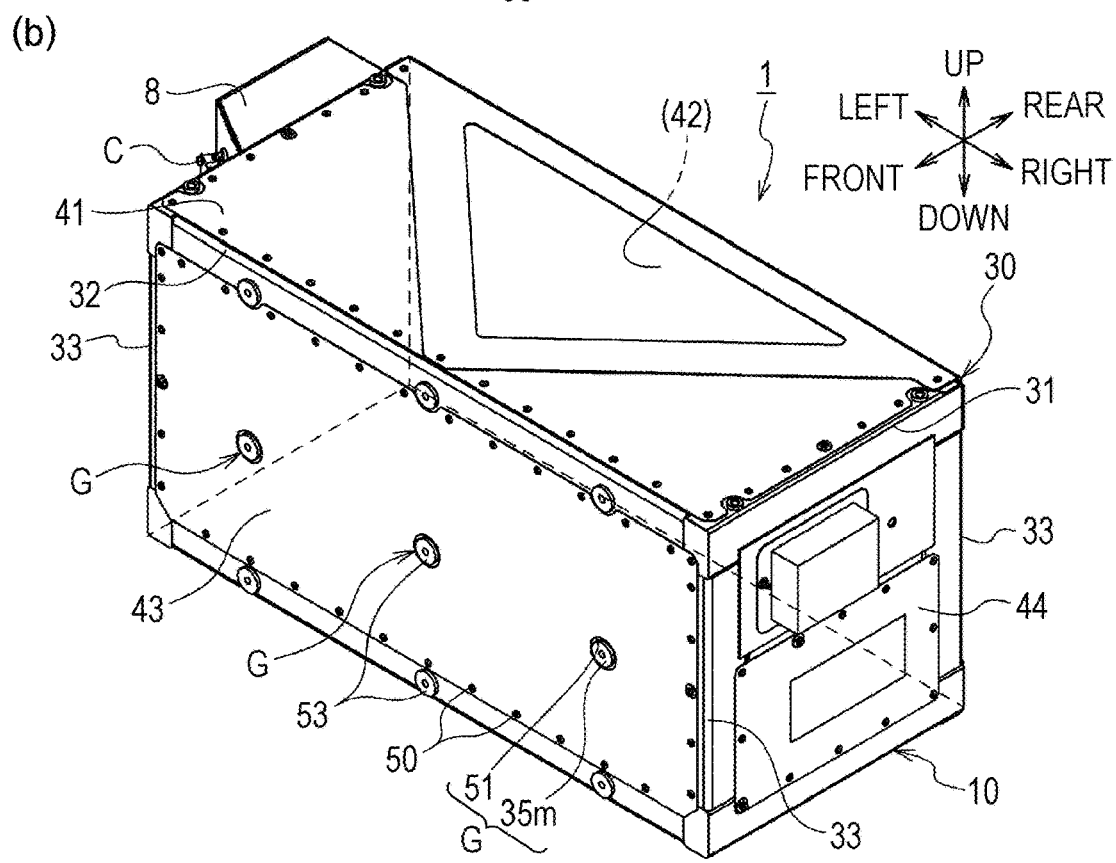

FIG. 8
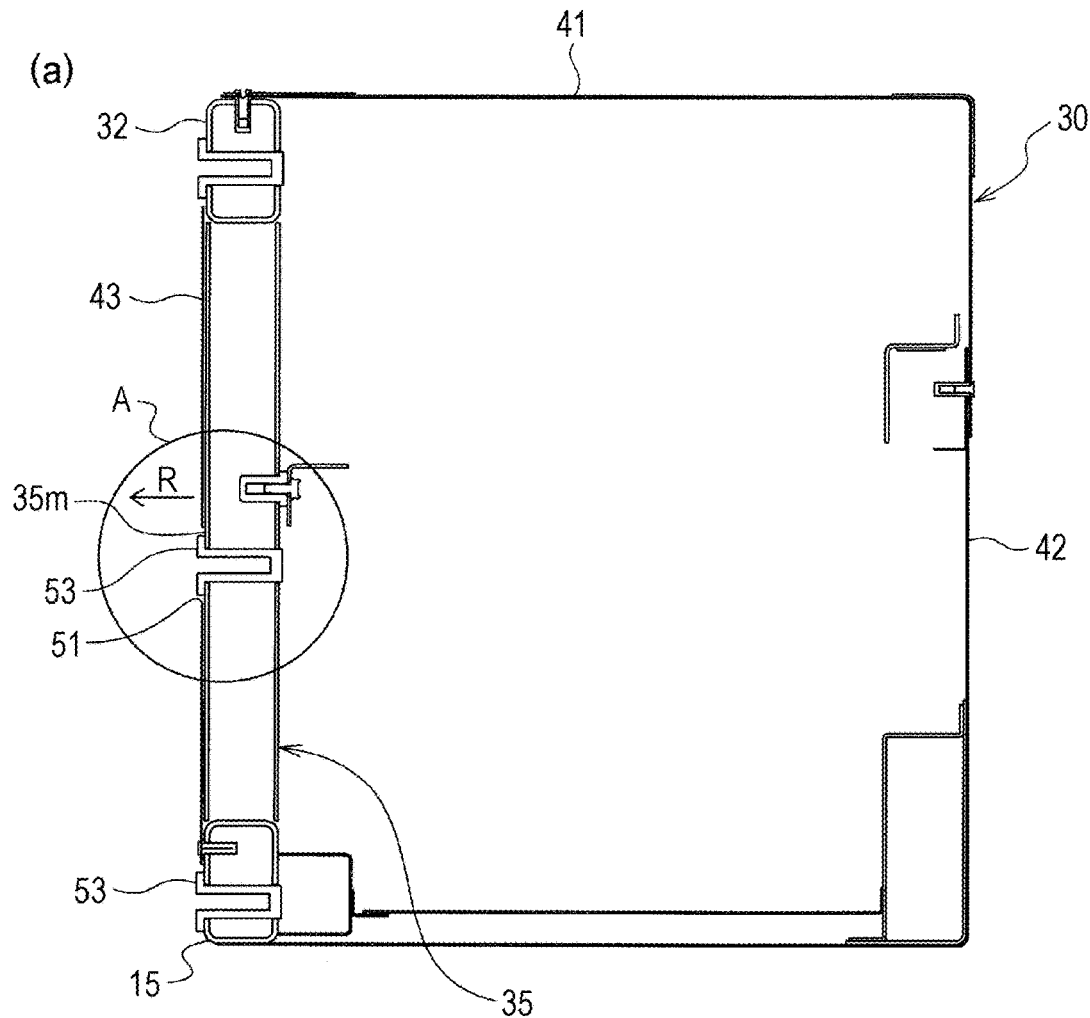
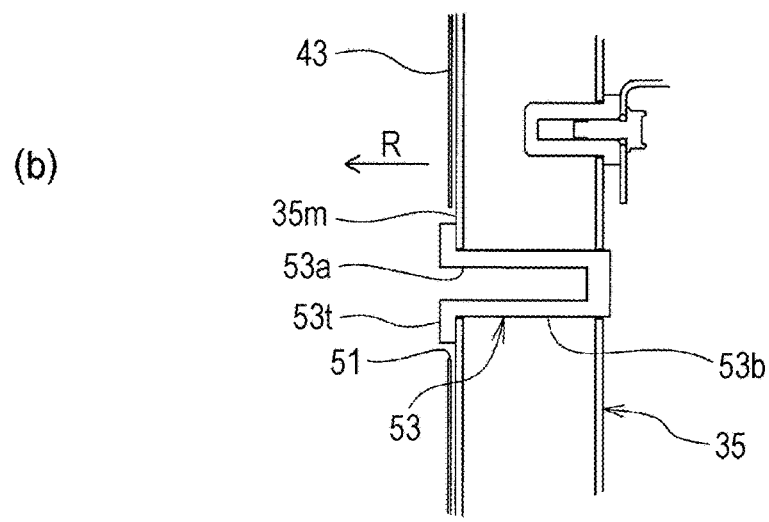

FIG. 9
(a)
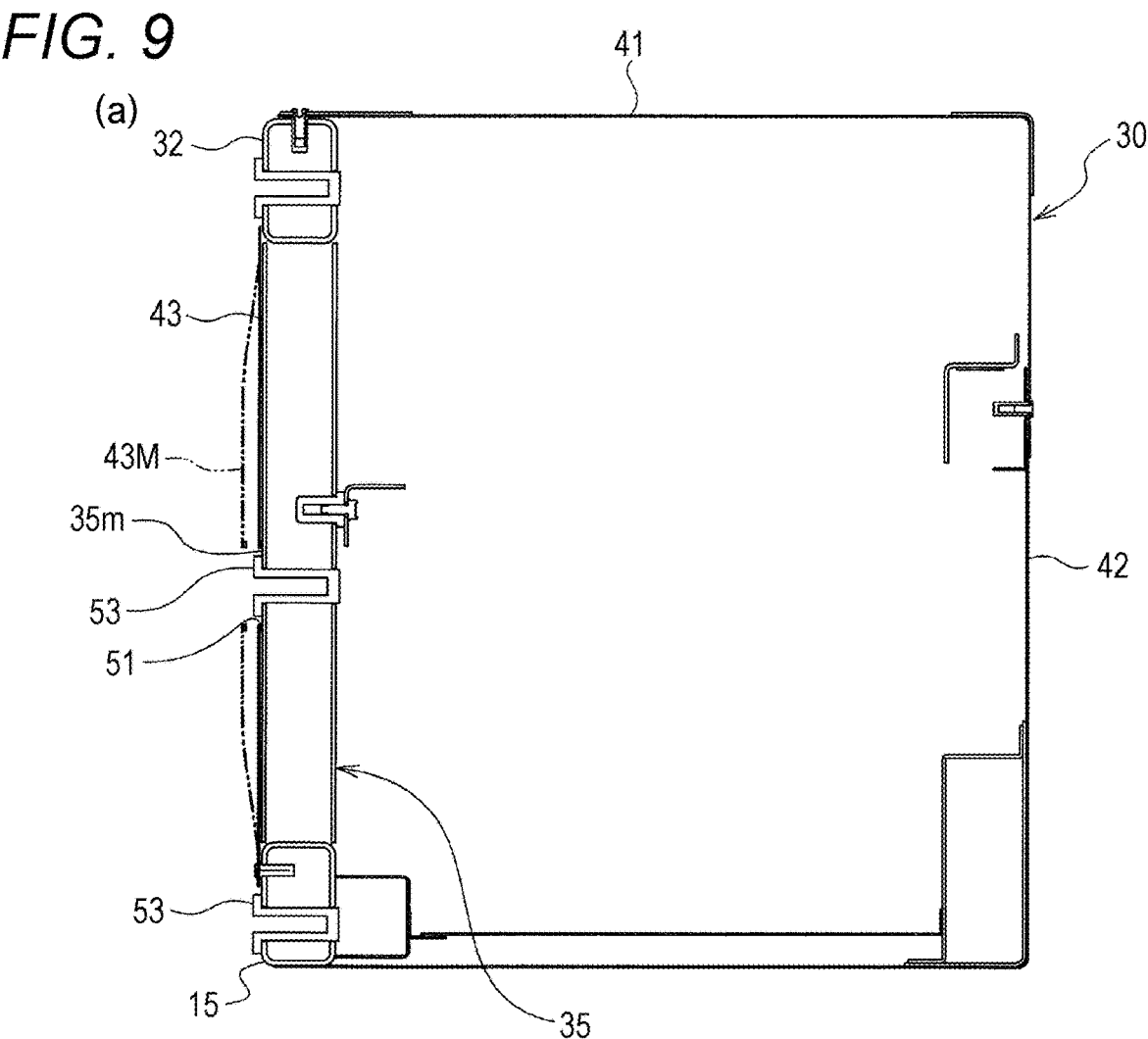
(b)
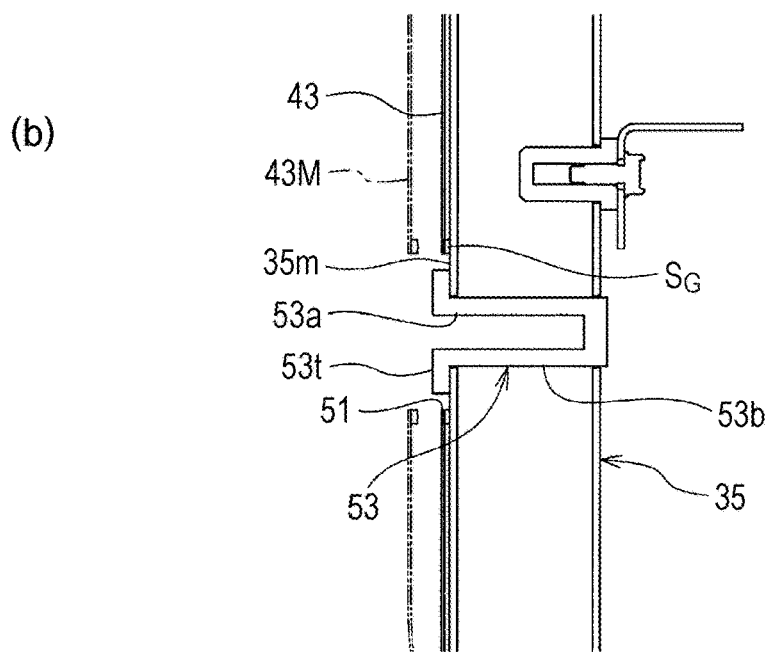

FIG. 14
(a)
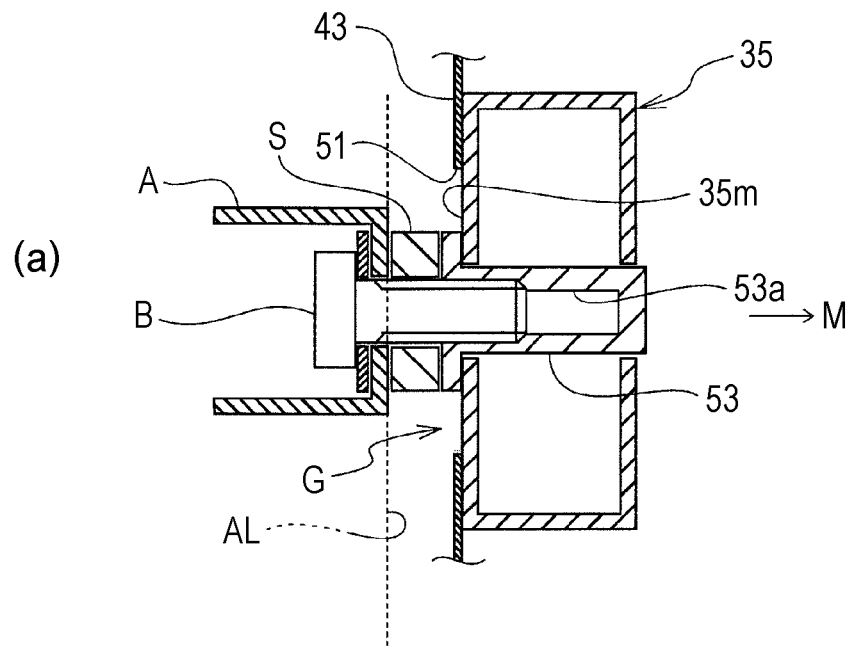
(b)
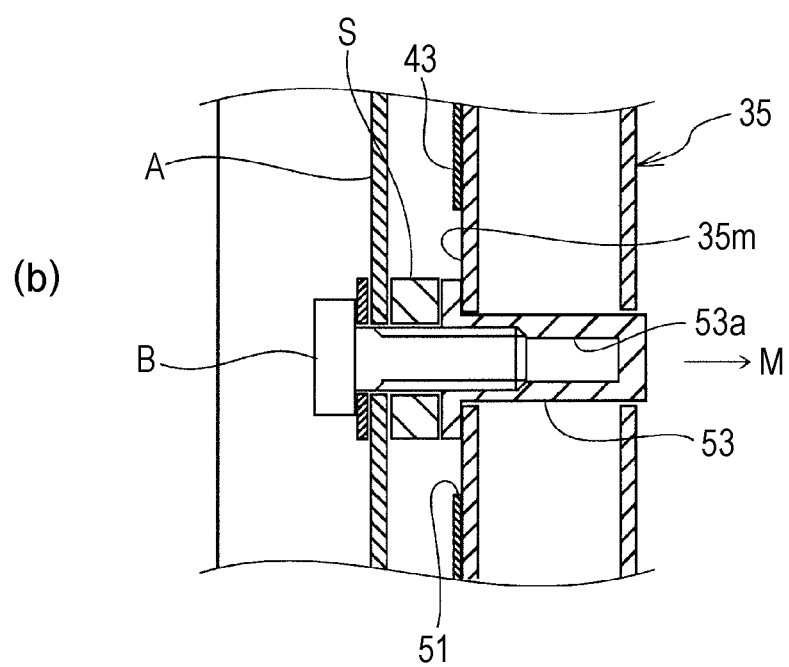

FIG. 15
(a)
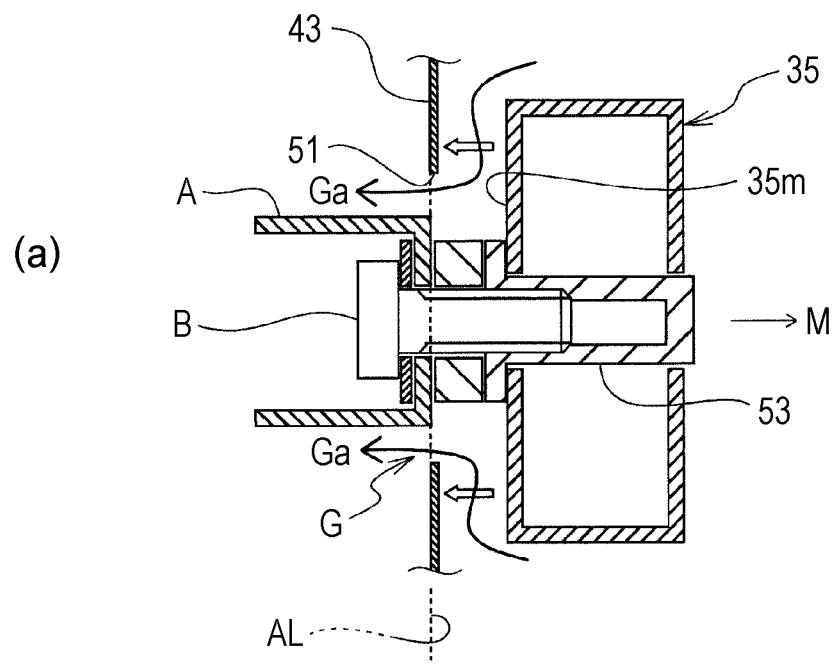
(b)
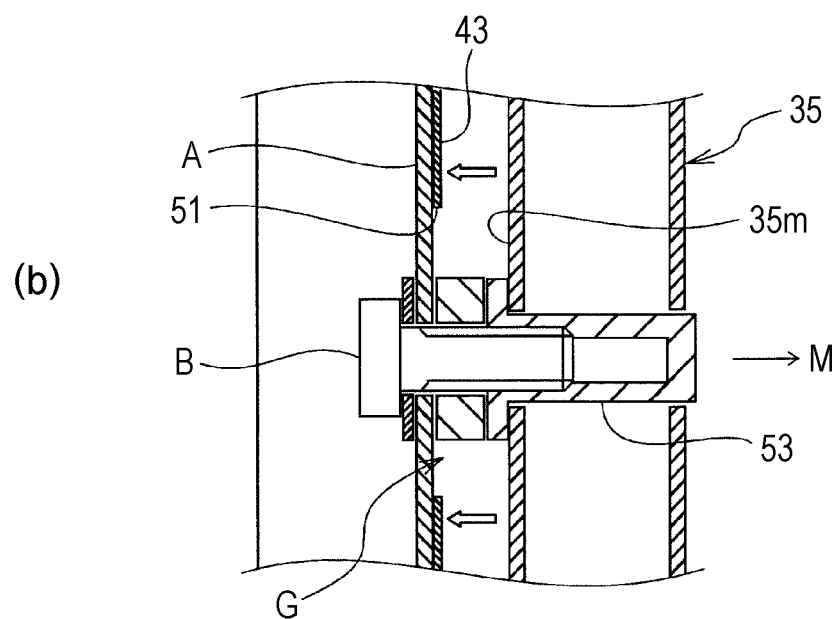

FIG. 22
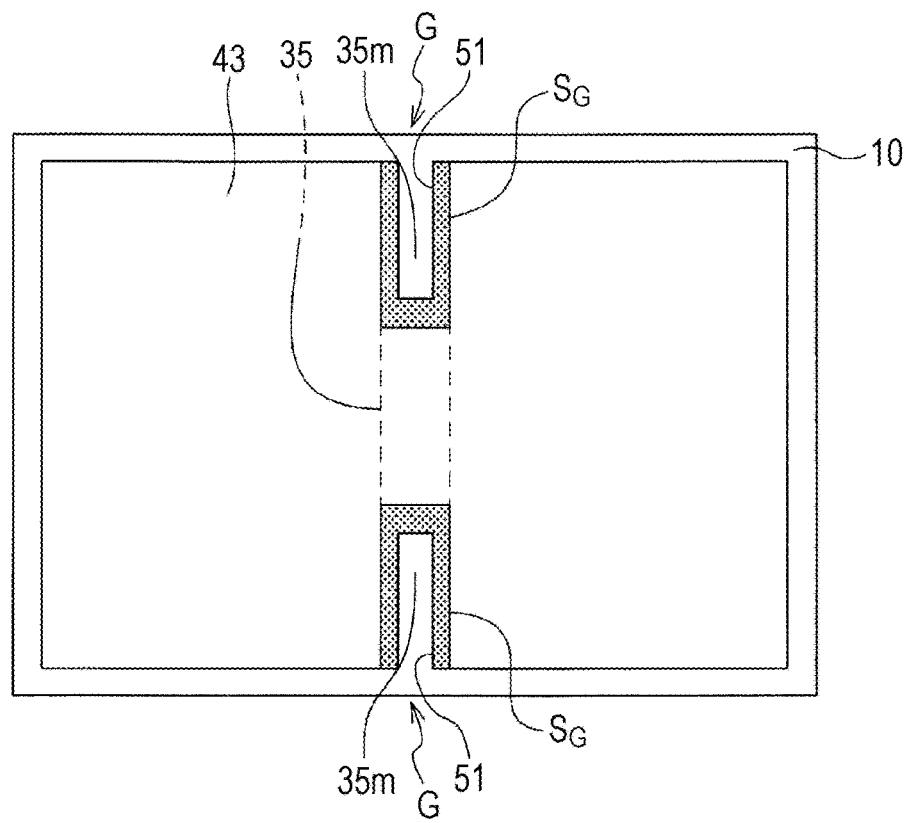
FIG. 23
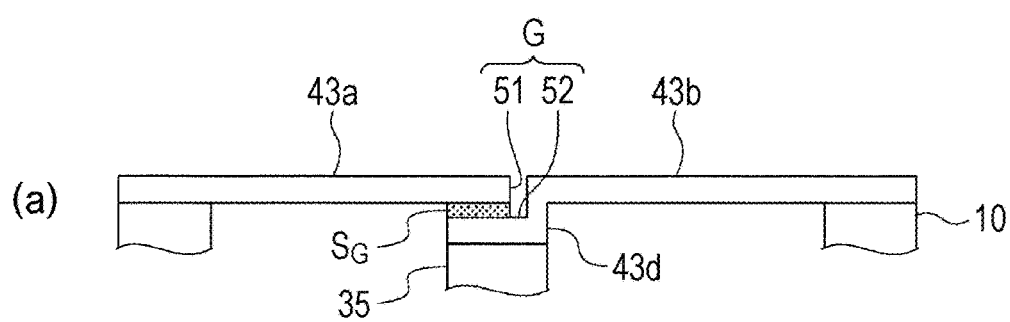
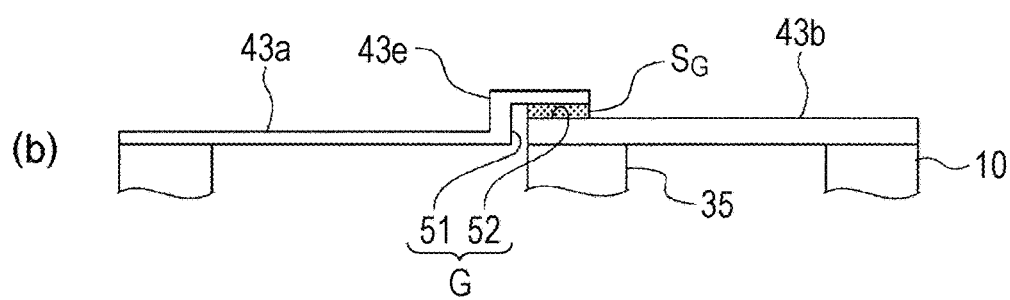

BATTERY CASE, VEHICLE COMPRISING SAID BATTERY CASE, AND STATIONARY TYPE POWER STORAGE DEVICE

TECHNICAL FIELD

The present invention relates to a battery case in which a battery is housed in a housing.

BACKGROUND ART

In one example of on-vehicle power source devices in electric vehicles and hybrid vehicles, DC current converted into a three-phase AC power is supplied through an inverter to a motor generator in response to a request on a vehicle system side. In general, this type of on-vehicle power source device is formed of a battery pack combining a plurality of batteries. These batteries are housed in the housing of the battery case with a structure closed by wall plates.

Here, one example of this type of battery case is disclosed in Patent Literature 1. The battery case disclosed in this literature includes an opening part on a wall plate of the battery case. A lid member (plate) is attached integrally and locally to the wall plate so as to be fixed in a manner of covering this opening part. When the pressure in the battery case has increased, the wall plates swell outward and accordingly, the lid member also moves outward together with the wall plates. Here, a gap is generated between the wall plate and the lid member, and from this gap, the gas in the battery case can be discharged out of the battery case.

CITATION LIST

Patent Literature

PATENT LITERATURE 1: WO2017/060942

SUMMARY OF INVENTION

Problems to be Solved by Invention

In the battery case disclosed in Patent Literature 1, however, the lid member also moves outward together with the wall plates. Therefore, the gap that is generated is as small as the amount of deformation of the wall plates. As a result, enough gas discharge flow rate may not be secured.

The present invention has been made in view of such a problem. An object of the present invention is to provide a battery case including a gas discharge mechanism that can secure enough gas discharge flow rate when the pressure in the battery case has exceeded the external air pressure, and also provide a vehicle and a fixed type energy storage device including the battery case.

Solution to Problems

In order to solve the above-described problem, a battery case according to an aspect of the present invention includes a housing in which a battery is housed, and a plurality of wall plates that covers a periphery of the housing, the battery case including a gas discharge mechanism including a gas discharge port that opens in at least one of the plurality of wall plates, and a lid part that is disposed to cover the gas discharge port from inside the at least one wall plate and is fixed on a side of the housing. The gas discharge mechanism is configured to cause the at least one wall plate to separate from the lid part by outward swelling deformation of the at least one wall plate in accordance with increase of internal pressure of the battery case so that a facing gap is formed between the lid part and the at least one wall plate while the lid part remains fixed to the side of the housing, and accordingly discharge gas in the battery case through the facing gap and the gas discharge port.

In order to solve the above problem, a vehicle according to one aspect of the present invention includes the battery case according to one aspect of the present invention in an on-vehicle power source device. In order to solve the above problem, a fixed type energy storage device according to one aspect of the present invention includes the battery case according to one aspect of the present invention.

Effects of Invention

According to the present invention, a gas discharge mechanism in a battery case according to one aspect of the present invention includes a gas discharge port that opens in a wall plate covering a periphery of a housing, and a lid part that covers the gas discharge port from inside the wall plate. The lid part is fixed on the housing side. Therefore, the lid part can be prevented from moving outside the battery case. Therefore, when the wall plate is deformed swelling outward due to the increased internal pressure, only the wall plate can be moved relatively outward while the lid part is not moved outside the battery case. Accordingly, the facing gap between the lid part and the periphery of the gas discharge port on the wall plate can be made large. Thus, when the pressure in the battery case becomes high, enough gas discharge flow rate can be secured. Note that, in the present invention, the expression "lid part is not moved" means that the lid part is not moved substantially in view of the function of the gas discharge mechanism, and includes the case in which the lid part is hardly moved and the case in which the lid part is moved a little.

BRIEF DESCRIPTION OF DRAWINGS

FIG. 1(a) and FIG. 1(b) are schematic perspective views of a battery pack including a first embodiment of a battery case according to one aspect of the present invention.

FIG. 8(a) is a cross-sectional view taken along Y-Y in FIG. 7, and FIG. 8(b) is a magnified view of A part in FIG. 8(a).

FIG. 9 is a diagram for describing operation of the gas discharge mechanism according to the first embodiment, in which an image (reference symbol 43M) in a state at the operation corresponding to FIG. 8 is illustrated with a two-dot chain line.

FIG. 14(a) and FIG. 14(b) are schematic cross-sectional views for describing one example of an attaching part to an equipment object to which the battery case according to the present invention is provided, in which FIG. 14(a) illustrates the cross section of a stud nut part for attachment taken along a longitudinal direction including an axial line, and FIG. 14(b) illustrates the cross section of the stud nut part for attachment taken along a lateral direction including the axial line.

FIG. 15(a) and FIG. 15(b) are schematic cross-sectional views for describing one example of an attaching part to an equipment object to which the battery case according to the present invention is provided, in which FIG. 15(a) illustrates the cross section of a stud nut part for attachment taken along the longitudinal direction including the axial line, and FIG. 15(b) illustrates the cross section of the stud nut part for attachment taken along the lateral direction including the axial line.

FIG. 22 is a schematic plan view for describing a third modification of the gas discharge mechanism in the battery case according to one aspect of the present invention.

FIG. 23(a) and FIG. 23(b) are schematic front views for describing fourth and fifth modifications of the gas discharge mechanism in the battery case according to one aspect of the present invention.

DESCRIPTION OF EMBODIMENTS

Embodiments and modifications according to the present invention are hereinafter described with reference to the drawings as appropriate. Note that since the drawings are schematic, it should be noted that the relation, the ratio, and the like between the thickness and the planar size are different from the actual ones. The relation and the ratio between the respective sizes may be different between some of the drawings. The embodiments and modifications below illustrate examples of a device and a method for embodying the technical concept of the present invention. The technical concept of the present invention does not limit the materials, shapes, structures, arrangements, and the like of the constituent components to the embodiments and modifications below.

First Embodiment

Figure 2:
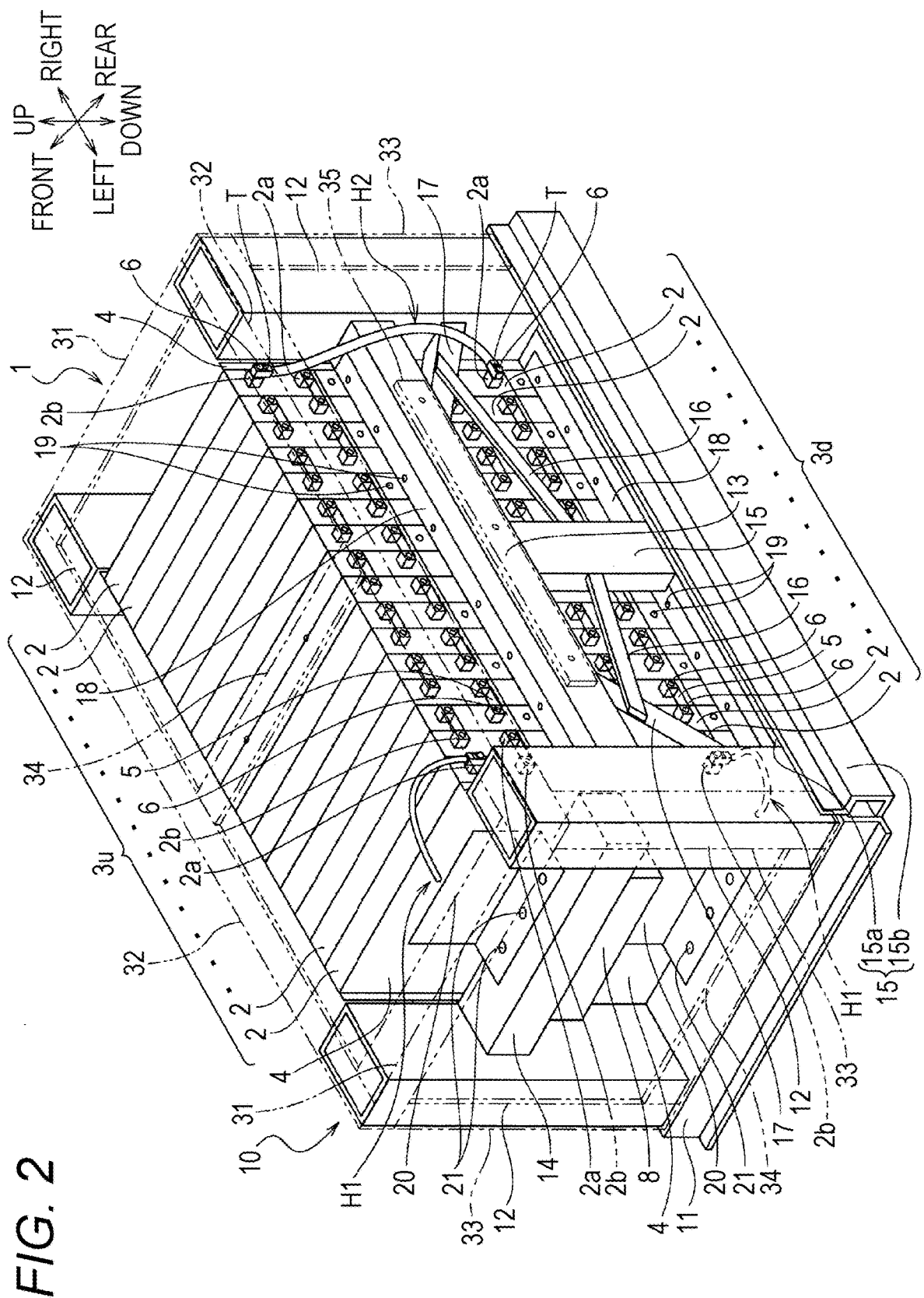
FIG. 2 is a schematic perspective view of the battery pack with the surrounding wall plates detached from the battery case according the first embodiment illustrated in FIG. 1, in which a part of subframes constituting the housing is illustrated with a two-dot chain line.

As illustrated in FIG. 1, a battery pack 1 according to a first embodiment includes a battery case 30 for housing a plurality of batteries 2 (see FIG. 2 to be described below) inside a housing 10. The battery case 30 includes the housing 10 formed to have a frame shape, and a plurality of wall plates (cover panels) 41 to 46 formed of rectangular steel plates for covering opening parts of the housing 10. In the present embodiment, FIG. 2 illustrates the housing 10 from which the wall plates 41 to 46 have been detached, and the housing 10 is formed to have a rectangular frame shape from a plurality of frames including main frames 11 to 15 and subframes 31 to 33. In this drawing, wall plate attachment angles 31 to 33 corresponding to the subframes constituting a part of the frames of the housing 10 are attached at positions illustrated with two-dot chain lines.

As illustrated in FIG. 2, the battery pack 1 according to the present embodiment is formed by stacking a plurality of stages (in this example, two stages) of upper and lower stacks 3u and 3d in an up-down direction in the housing 10. In each stack, a plurality of (in this example 16) batteries 2 is arranged in a line. In the lower stack 3d in the first stage, the batteries 2 are arranged in a left-right direction in FIG. 2. The upper stack 3u in the second stage is disposed above the lower stack 3d, and the batteries 2 are arranged in the left-right direction in FIG. 2.

The upper and lower stacks 3u and 3d are fixed to the housing 10 of the battery case 30. The battery pack 1 where the upper and lower stacks 3u and 3d are fixed to the housing 10 is mounted on a vehicle in a manner that the housing 10 is fixed to the housing of the vehicle, for example. In each battery 2 forming the upper stack 3u and the lower stack 3d, a plurality of cells, which is not shown, each corresponding to a lithium ion secondary battery, is housed in a case with a flat rectangular parallelepiped shape. Each battery 2 includes a positive electrode terminal 2a and a negative electrode terminal 2b on one side end surface.

In the present embodiment, the surface of each battery 2 in the lower stack 3d that includes the positive electrode terminal 2a and the negative electrode terminal 2b is on the front side. In the arranging direction of the batteries 2 on a junction box 8 side in the same drawing, the positive electrode terminal 2a is disposed on the upper side and the negative electrode terminal 2b is disposed on the lower side. The batteries 2 are arranged in order so that the positive electrode terminals 2a and the negative electrode terminals 2b of the adjacent batteries 2 are vertically opposite ranging to the end opposite to the junction box 8 side.

In addition, the surface of each battery 2 in the upper stack 3u that includes the positive electrode terminal 2a and the negative electrode terminal 2b is on the front side. In the arranging direction of the batteries 2 on the junction box 8 side, the positive electrode terminal 2a is disposed on the lower side and the negative electrode terminal 2b is disposed on the upper side. The batteries 2 are arranged in order so that the positive electrode terminals 2a and the negative electrode terminals 2b of the adjacent batteries 2 are vertically opposite ranging to the end opposite to the junction box 8 side.

Figure 3:
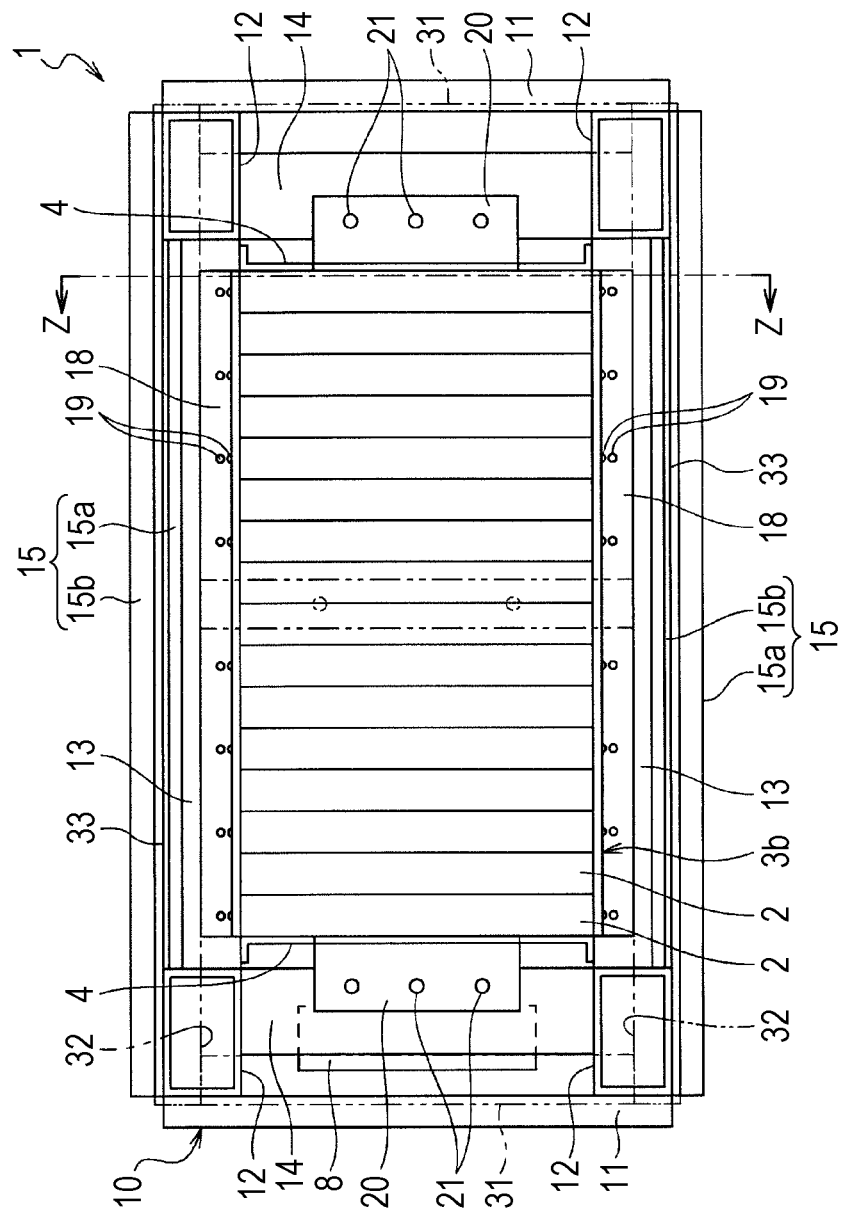
FIG. 3 is a plan view of the battery pack with the surrounding wall plates detached from the battery case illustrated in FIG. 1, in which a part of the subframes constituting the housing is illustrated with a two-dot chain line.

As illustrated in FIG. 2 and FIG. 3, the housing 10 has a lower frame body of which plan view has a rectangular shape. The lower frame body includes the two columnar supporting members 11, which are disposed apart from each other in the lower part in the left-right direction, and the two fundamental beam members 15, which are disposed apart from each other in the lower part in the front-rear direction. At four corners of the lower frame body, the four columnar members 12, which are square-tubular members made of steel, are provided in a standing manner. The left and right columnar members 12 are connected to each other in a manner that their middle parts are connected by the two first beam members 13 that are disposed horizontally.

In addition, the front and rear columnar members 12 are connected to each other in a manner that their middle parts are connected by the two second beam members 14 that are disposed horizontally. Furthermore, as indicated on the front side in FIG. 2, the second fundamental beam member 15 is provided in a standing manner at a center position between the left and right columnar members 12 so as to connect between the first beam member 13 and the fundamental beam member 15 in the present embodiment. In addition, the second fundamental beam member 15 and the left and right columnar members 12 are connected to each other with two braces 16 extending obliquely, and two subbraces 17 that intersect with these braces 16.

Figure 4:
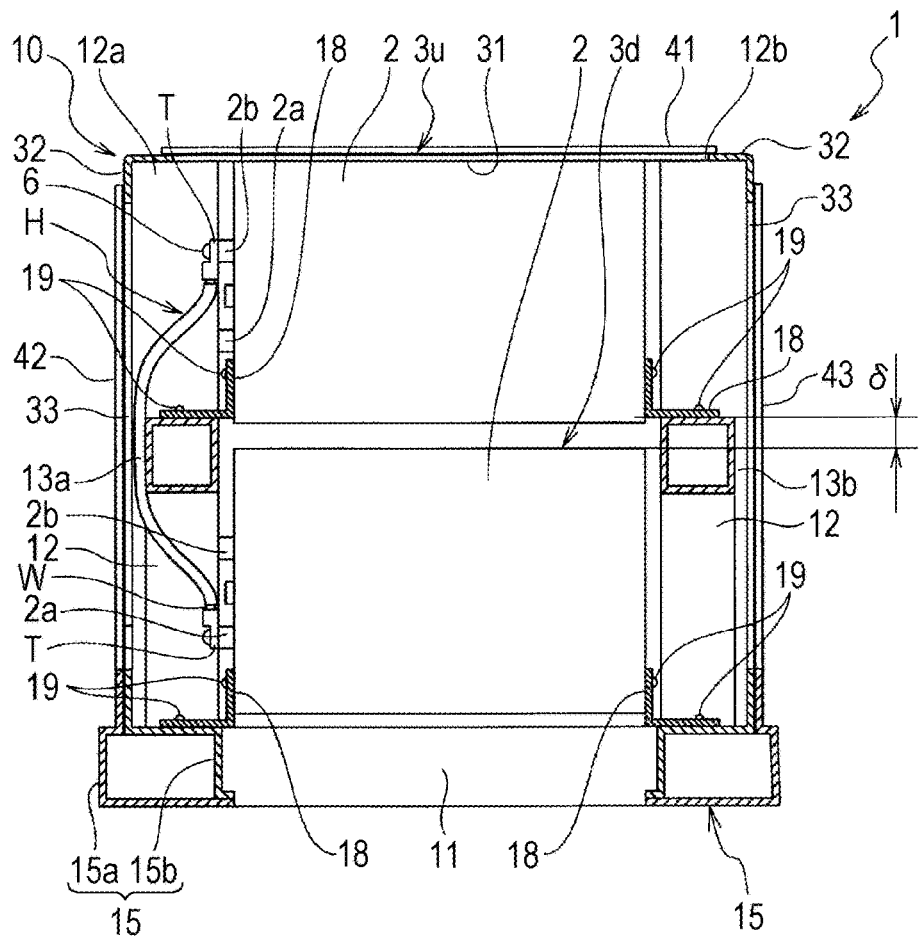
FIG. 4 is a cross-sectional view taken along line Z-Z in FIG. 3.

As illustrated in FIG. 4, two first fixing members 18 on the front and rear sides are provided to the two fundamental beam members 15 in accordance with the lower stack 3d. By these first fixing members 18, the lower stack 3d is fixed to the housing 10. The first fixing member 18 is a fixing metal fitting extending in the left-right direction of which cross-sectional shape is like a letter L. The front surface and the rear surface of the batteries 2 of the lower stack 3d are fixed with a plurality of attachment screws 19 on an upper surface of the second fundamental beam members 15 of the front and rear fundamental beam members 15. An end plate 4 is fixed to each of left and right side surfaces of the lower stack 3d. Each end plate 4b is fixed to an upper surface of each of the left and right columnar supporting members 11 by second fixing members 20 that are fixing metal fittings of which cross-sectional shape is like a letter L.

The upper stack 3u is fixed to the two first beam members 13 by the two first fixing members 18 in a floating state so that a gap d is provided between the upper stack 3u and the lower stack 3d. The first fixing member 18 is a fixing metal fitting extending in the left-right direction of which cross-sectional shape is like a letter L. The first fixing member 18 fixes the front surfaces of the batteries 2 of the upper stack 3u on the upper surface of the first beam member 13 with the attachment screws 19. In addition, the end plate 4 of which cross-sectional shape is like a letter L is fixed to each of the left and right side surfaces of the upper stack 3u. Each end plate 4 is fixed on the upper surface of the second beam member 14 by the second fixing member 20 with a plurality of attachment screws 21.

Figure 5:
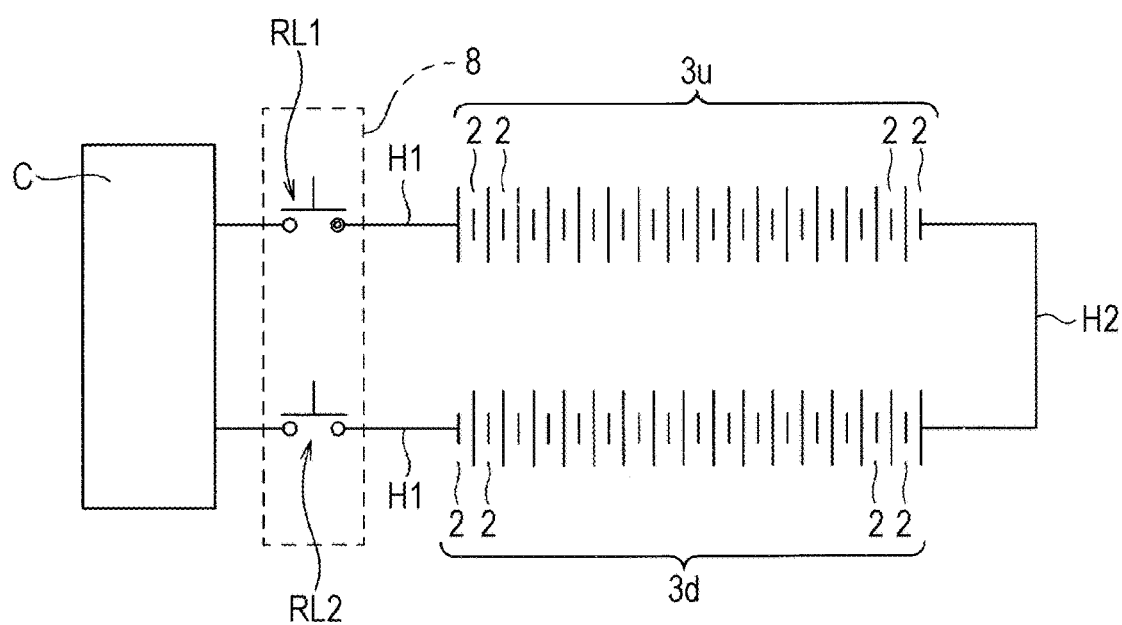
FIG. 5 is a schematic circuit diagram of the battery pack illustrated in FIG. 2.

Here, in the electric circuit of this battery pack 1, the upper stack 3u and the lower stack 3d are connected in series as illustrated in FIG. 5. In the upper stack 3u, the positive electrode terminal 2a of the battery 2 on the junction box 8 side is connected to a relay RL1 in the junction box 8 through a harness H1 as illustrated in FIG. 2 and FIG. 5. The negative electrode terminals 2b of the adjacent batteries 2 are connected in order to the positive electrode terminals 2a through a bus bar 5 illustrated in FIG. 2.

Such connection is repeated and thus, the negative electrode terminal 2b of the battery 2 at the end of the upper stack 3u is connected to the positive electrode terminal 2a of the battery 2 at the end of the lower stack 3d through a harness H2 as a conductive path on the side opposite to the junction box 8. In the harness H2, a crimped terminal T is connected at each end of an electric wire W. The crimped terminals T are attached to the negative electrode terminal 2b and the positive electrode terminal 2a by attachment screws 6. The negative electrode terminal 2b of the battery 2 of the upper stack 3u on the junction box 8 side is connected to a relay RL2 through the harness H1. In addition, the relay RL1 and the relay RL2 are connected to a connector C. This connector C is connected to an external load that is not illustrated.

Back to FIG. 1, in the aforementioned battery case 30, the periphery of the housing 10 is covered with the wall plates (cover panels) 41 to 46 so that the inside of the battery pack 1 is sealed. In the present embodiment, a total of six wall plates including the upper panel 41, the rear panel 42, the front panel 43, the right side panel 44, the left side panel 45, and the junction box panel 46 are provided as the wall plates 41 to 46.

In the present embodiment, the left and right columnar members 12 are connected to each other in a manner that their upper end parts are connected by the two wall plate attachment angles 32 that are disposed horizontally. This wall plate attachment angle 32 is a fixing metal fitting extending in the left-right direction of which cross-sectional shape is like a letter L and is fixed to the left and right columnar members 12 with a plurality of attachment countersunk head screws (not illustrated).

In addition, the front and rear columnar members 12 are connected to each other in a manner that their upper end parts are connected by the two wall plate attachment angles 31 that are disposed horizontally. This wall plate attachment angle 31 is a fixing metal fitting extending in the front-rear direction of which cross-sectional shape is like a letter L and is fixed to the front and rear columnar members 12 with a plurality of attachment countersunk head screws (not illustrated).

At outer corners of the columnar members 12 at four corners, the four wall plate attachment angles 33 are attached along the columnar members 12 as the subframes with a plurality of attachment countersunk head screws (not illustrated). In addition, the lower end parts of the front and rear columnar members 12 are connected to each other with a plurality of attachment countersunk head screws (not illustrated) by two wall plate attachment angles 34 that are disposed horizontally.

Accordingly, the rectangular frame part as the subframes is formed by the four wall plate attachment angles 31 and 32 that extend in the front-rear and left-right directions at an opening part at the upper ends of the columnar members 12 at the four corners. The upper surfaces of these four wall plate attachment angles 31 and 32 are configured as an attachment surface for the upper panel 41. At the front and rear opening parts formed by the left and right columnar members 12, the rectangular frame part as the subframes is formed by the side surfaces of the wall plate attachment angles 31 extending in the front-rear direction, the side surfaces of the two wall plate attachment angles 33 on the front and rear sides, and the side surfaces of the wall plate attachment angles 34 disposed in the lower part. The side surfaces of these four wall plate attachment angles 31, 33, and 34 are configured as attachment surfaces for the right side panel 44 and the left side panel 45.

Furthermore, the rectangular frame parts as the subframes are formed by the side surfaces of the wall plate attachment angles 32 extending in the left-right direction, the side surfaces of the two wall plate attachment angles 33 on the left and right sides, and the side surface of the fundamental beam member 15 disposed in the lower part in the left and right opening parts formed by the front and rear columnar members 12. This rectangular frame parts are structured as the attaching surfaces for the rear panel 42 and the front panel 43. In the present embodiment in particular, three longitudinal frames 35 are provided as the attaching surface for the front panel 43, which is described below.

Along the four sides of each of the wall plates 41 to 46, a number of penetrating holes, which are not illustrated, are formed and used to attach wall plate set screws 50. At proper positions on opposing surfaces of the main frames 11 to 15 and the subframes 31 to 33, female screws are provided in accordance with the penetrating holes. These female screws form a plurality of fastening parts that is fastened and fixed by the wall plate set screws 50.

In the present embodiment, in these fastening parts, a sealing material S is applied on the wall plates 41 to 46 along a sealing line SL that surrounds the periphery of the opening parts so as to connect the fastening parts to each other, and then these wall plates 41 to 46 are fastened by the wall plate set screws 50. Thus, the opening parts of the housing 10 are sealed for sure along the entire circumference.

Here, the battery case 30 according to the first embodiment includes a gas discharge mechanism G as illustrated in FIG. 1. The gas discharge mechanism G includes a lid part 35m and a gas discharge port 51 that opens in the front panel 43 of the wall plates that cover the periphery of the housing 10. The lid part 35m is disposed to cover the gas discharge port 51 from inside the front panel 43. In addition, the lid part 35m is formed using the opposing surface of the longitudinal frame 35 that is the frame member of the housing 10.

The outer shape of the battery case 30 according to the first embodiment is a substantially rectangular parallelepiped shape. It is preferable to provide the gas discharge mechanism G on the surface with the maximum area among the six surfaces of this rectangular parallelepiped shape. This structure makes it easier to release the gas discharge mechanism G using the bending of the panel. In the example of the first embodiment, the four surfaces of the battery case 30 extending in the longitudinal direction have substantially the same area. Therefore, it is preferable to provide the gas discharge mechanism G on any one of these four surfaces.

Note that the position of the gas discharge mechanism G is not limited to this example and may be any position on the wall plates 41 to 46 that cover the periphery of the housing 10. Note that in this example, stud nuts 53 for attaching the battery case 30 are provided to the surface of the longitudinal frame 35 that faces the gas discharge port 51 (the stud nuts 53 are described in detail in the attachment example below).

A structure of the gas discharge mechanism G is described in detail below with reference to FIG. 6 to FIG. 13. In the example described in the present embodiment, the gas discharge mechanisms G are provided at the three positions including the center and the left and right thereof on the front panel 43 among the wall plates 41 to 46 as illustrated in FIG. 1. Note that the gas discharge mechanisms G at these three positions are configured similarly. Therefore, a first gas discharge mechanism G at the center, which is denoted by a reference symbol (G1) in FIG. 1, is described below and the magnified illustration and the description about the other gas discharge mechanisms G denoted by reference symbols (G2) and (G3) are omitted.

Figure 6:
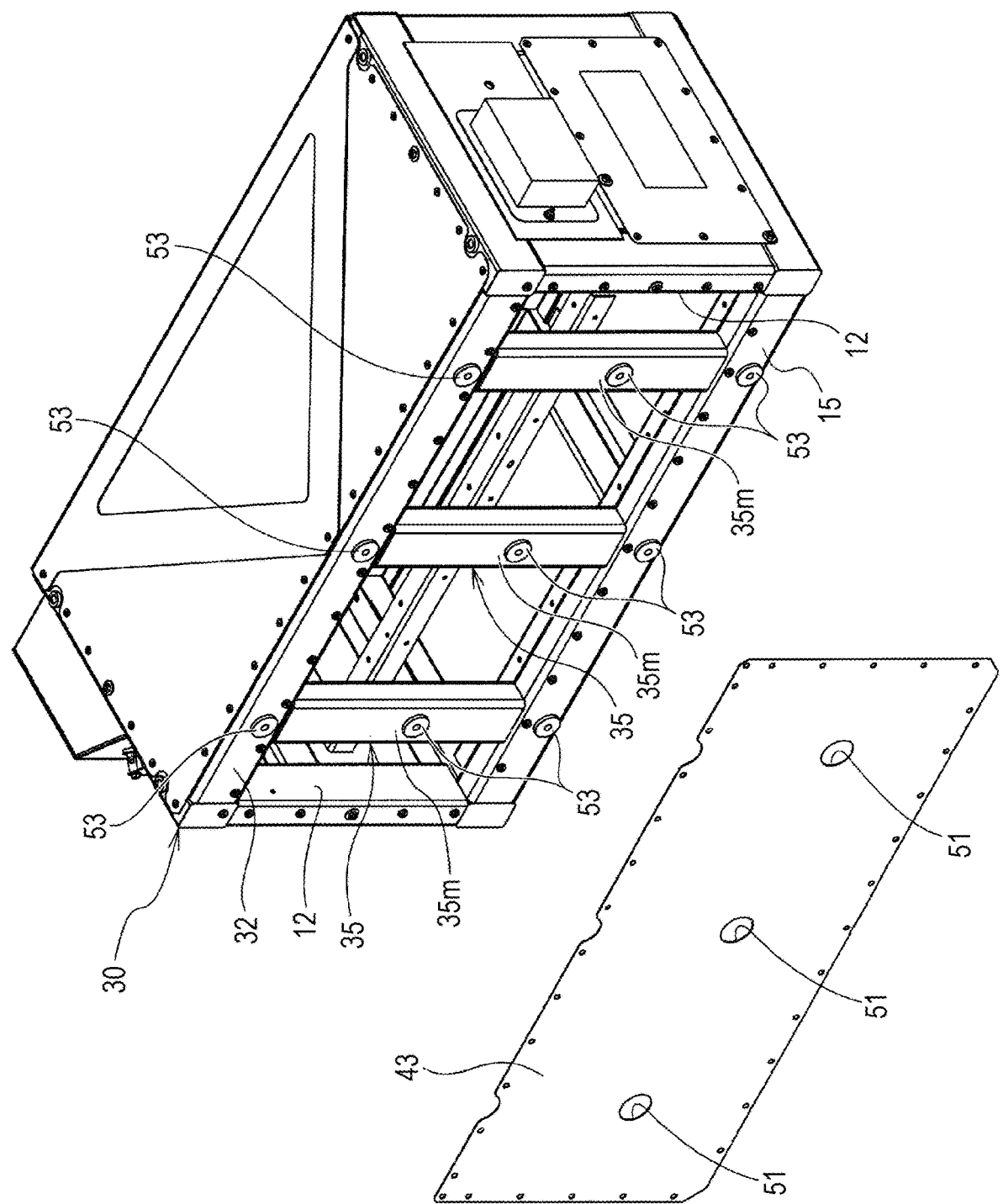
FIG. 6 is a schematic perspective view of the battery case according to the first embodiment, in which the wall plate including the gas discharge mechanism is detached.
Figure 7:
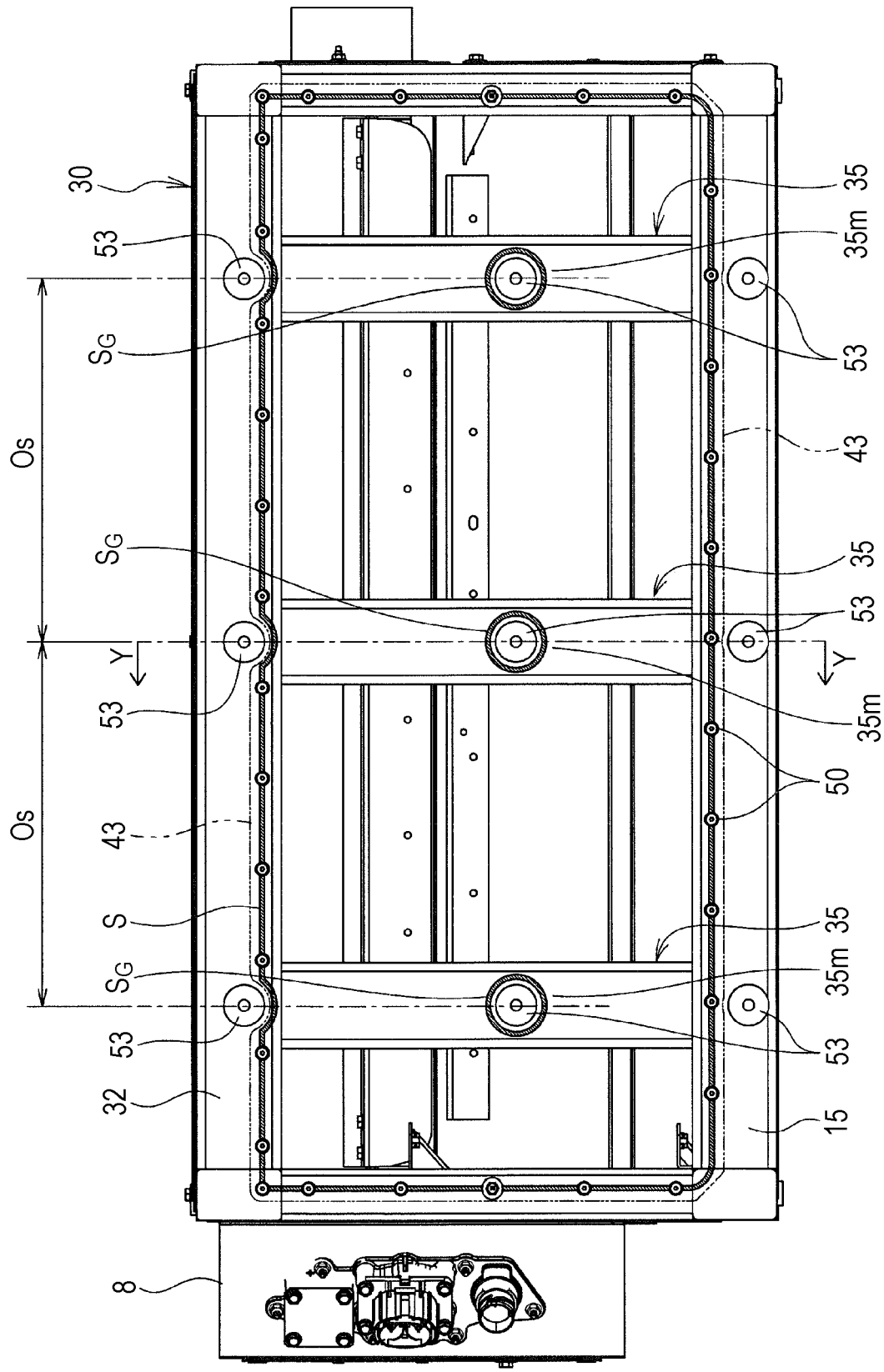
FIG. 7 is a schematic front view of the housing of the battery case according to the first embodiment.

In the first embodiment, the gas discharge mechanisms G provided to the front panel 43 are disposed apart from each other at three positions including the center and the left and right thereof on the front panel 43 as illustrated in FIG. 6 and FIG. 7. This front panel 43 is curved and deformed relatively largely in the front-rear direction of the housing 10 (R direction in FIG. 8) when the internal pressure of the battery case 30 is increased. Regarding the degree of the curving deformation, the center of the front panel 43 is curved the most easily, and at the position away to the left or right, the curving is less than at the center. In this embodiment, this amount of deformation is found in advance and used as how the gas discharge mechanism G operates.

Each gas discharge mechanism G includes the lid part 35m and the gas discharge port 51 with a circular shape that is opened in the front panel 43 as illustrated in FIG. 6. The lid part 35m is formed using a surface of each of the three longitudinal frames 35 disposed to face along the inner surface of the front panel 43 so as to cover the gas discharge port 51. That is to say, in the first embodiment, the frame member of the housing 10 also serves as the lid part 35m. Alternatively, another member with higher strength than the front panel 43 in the battery case 30 (for example, supporting angle that supports the battery on the housing) may also serve as the lid part.

In the present embodiment, the lid part 35m is the opposing surface of a central part of the longitudinal frame 35 that is the frame member of the housing 10. As illustrated in FIG. 7, in addition to the sealing at the periphery of the front panel 43, the space between the rear surface of the front panel 43 along the periphery of the circular gas discharge port 51 and the opposing surface of the lid part 35m in each gas discharge mechanism G is sealed.

In the present embodiment, a steel plate thicker than the material of the front panel 43 is used for each of the three longitudinal frames 35. The longitudinal frames 35 are disposed to face the gas discharge ports 51 so that the center of each longitudinal frame 35 in the width direction coincides with the center of the corresponding gas discharge port 51.

In the present embodiment, the front panel 43 and the longitudinal frame 35 have their facing surfaces bonded together by a suitable sealing material SG such as a liquid gasket so as to surround the peripheral part of the gas discharge port 51. Thus, the housing 10 is substantially sealed so that the entry of rain water, dust, or the like from the outside is prevented.

In one example described here, the sealing material SG is applied in a ring shape. However, alternatively, the sealing material SG may be applied concentrically multiple times (for example, twice) to form a plurality of ring shapes. In addition, the shape of the gas discharge port 51 and the shape of the sealing material SG that is applied surrounding the gas discharge port 51 are circular in this embodiment; however, the shape is not limited thereto and may be any shape such as a rectangular shape, a hexagonal shape, an octagonal shape, or a slit shape described below in modifications.

In the present embodiment, the front panel 43 is formed of a steel plate thinner than the rear panel 42 that faces the front panel 43. Thus, the front panel 43 is deformed elastically more than the rear panel 42 facing the front panel 43 when the internal pressure of the battery case 30 is increased.

Accordingly, when the internal pressure of the battery case 30 is increased, the front panel 43 swells outward and the rear surface of the front panel 43 is separated from the opposing surface of the lid part 35m as FIG. 9 illustrates the operation state of the gas discharge mechanism G. As a result, the internal gas is discharged from a facing gap ΔT therebetween. In the present embodiment, the lid part 35m is stronger than the front panel 43 because the lid part 35m is the outer surface of the longitudinal frame 35 with high rigidity.

Therefore, at the gas discharge, the lid part 35m hardly moves and only the front panel 43 is deformed so as to swell outward. By the amount of outward swelling of only the front panel 43, the facing gap ΔT from the surface of the lid part 35m is generated. Thus, the substantial flow path area of the gas discharge port 51 is increased and the gas discharge flow rate can be sufficiently secured.

Figure 10:
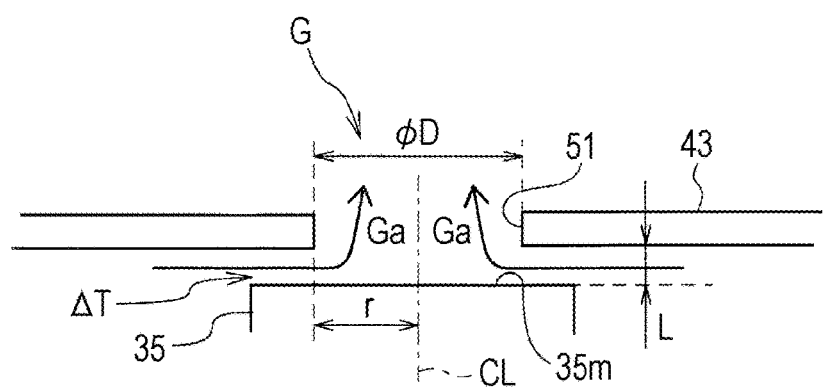
FIG. 10 is a schematic view for describing gas discharge flow rate in the gas discharge mechanism according to the first embodiment.

Here, the opening area of the gas discharge port 51 has the proper size in accordance with the capacity of the battery pack 1, for example. In the present embodiment, the diameter ϕD is about several centimeters as illustrated in FIG. 10. In the gas discharge mechanism G in the present embodiment, the final flow path area is determined by, not the opening area of the gas discharge port 51 itself, but the cooperation between the facing gap ΔT and the length of the periphery of the gas discharge port 51 (opening periphery) as indicated by the same drawing. That is to say, in the present embodiment, when the displacement L is small, the flow path area S is expressed as $S \cong 2\pi \cdot r \cdot L$. When the displacement L is sufficiently large, the maximum value Smax of the flow path area S is $S_{max} = \pi r^2$ and the large flow path area is secured.

Next, the operation effect of the battery case 30 according to the present embodiment is described. In the gas discharge mechanism G in the present embodiment, the surface of the lid part 35m is bonded to the opening periphery of the gas discharge port 51 with the sealing material SG so that the gas discharge port 51 is covered during the normal use as illustrated in FIG. 8. Therefore, the entry of foreign substances from the outside through the gas discharge port 51 is prevented.

On the other hand, as FIG. 9 illustrates the state in the operation, when the internal pressure in the housing 10 is increased because gas is generated by internal short-circuiting or the like in the battery 2, for example, the wall plates 41 to 46 covering the housing 10 will swell outward due to the difference in pressure from the atmospheric pressure. In particular, regarding the bending rigidity in a direction along the cross section in the same drawing in the gas discharge mechanism G in the present embodiment, the bending rigidity of the longitudinal frame 35 forming the surface of the lid part 35m is set higher than the bending rigidity of the front panel 43. Therefore, only the front panel 43 is curved in a direction away from the surface of the lid part 35m.

As the front panel 43 is curved and deformed, the facing gap ΔT is generated because the front panel 43 is moved to make the entire lid part 35m away from the opening periphery of the gas discharge port 51 along the periphery of the gas discharge port 51 in a direction where the front panel 43 and the lid part 35m are bonded with the sealing material SG. Therefore, the high-pressure gas in the housing 10 is discharged to the outside through the facing gap ΔT from the gas discharge port 51 as indicated by an arrow Ga in FIG. 10. That is to say, the gas discharge mechanism G in the present embodiment makes the front panel 43 away from the lid part 35m because the front panel 43 corresponding to at least one wall plate is deformed in a manner of swelling outward in accordance with the increase of the internal pressure of the battery case 30. While the lid part 35m is fixed on the housing 10 side, the facing gap ΔT between the lid part 35m and the front panel 43 is formed. Thus, the gas discharge mechanism G discharges gas out of the battery case 30 through the facing gap ΔT and the gas discharge port 51.

Here, regarding the facing gap ΔT, the amount of deformation changes depending on the degree of curving of the front panel 43, that is, the pressure in the housing 10 (pressure difference from atmospheric pressure on the outside) as illustrated in FIG. 10. That is to say, when the internal pressure is very high, the facing gap ΔT is largely formed. When the internal pressure is relatively low, the facing gap ΔT becomes relatively small.

That is to say, this gas discharge mechanism G can be opened and closed by changing the facing gap ΔT between the lid part 35m and the front panel 43 in a manner that only the front panel 43 is deformed to swell outward in accordance with the internal pressure of the battery case 30 while the lid part 35m is not moved out of the battery case 30.

Since the pressure receiving surface of the front panel 43 is set wide, the swelling deformation of the front panel 43 basically occurs within the range of the elastic deformation. In other words, the sufficient facing gap ΔT is generated within the range of the elastic deformation and the gas is discharged. In particular, when the internal pressure of the battery case 30 exceeds the external air pressure by more than a predetermined value, the gas discharge mechanism G according to the present embodiment opens the gas discharge port 51 by forming the facing gap ΔT between the lid part 35m and the front panel 43. When the internal pressure of the battery case 30 is high after the gas discharge port 51 is opened, the gas discharge mechanism G changes the facing gap ΔT so that the facing gap ΔT becomes larger than when the internal pressure is low. When the internal pressure of the battery case 30 is low after the gas discharge port 51 is opened, the gas discharge mechanism G changes the facing gap ΔT so that the facing gap ΔT becomes smaller than when the internal pressure is high. Furthermore, when the internal pressure is released after the gas discharge port 51 is opened, the gas discharge mechanism G operates so that the front panel 43 moves to the side for restoring to the initial shape and accordingly closes between the lid part 35m and the front panel 43.

That is to say, in the present embodiment, when the internal pressure of the battery case 30 exceeds the external air pressure by more than the predetermined value, the gas discharge mechanism G opens the gas discharge port 51 by forming the facing gap ΔT between the lid part 35m and the front panel 43. When the gas generation due to thermal runaway ends, the gas discharge mechanism G operates so that the front panel 43 moves to the side of restoring to the initial shape and closes between the lid part 35m and the front panel 43.

Then, when the gas in the housing 10 is discharged from the gas discharge port 51 and the internal pressure decreases, the front panel 43 restores to the initial shape. As illustrated in the example of opening/closing operation indicated by the graphs in FIG. 11 and FIG. 12, the lid part 35m gets close to the gas discharge port 51 and then returns to the closed state. Here, the "closed state" does not refer to the completely sealed or closed state.

Figure 11:
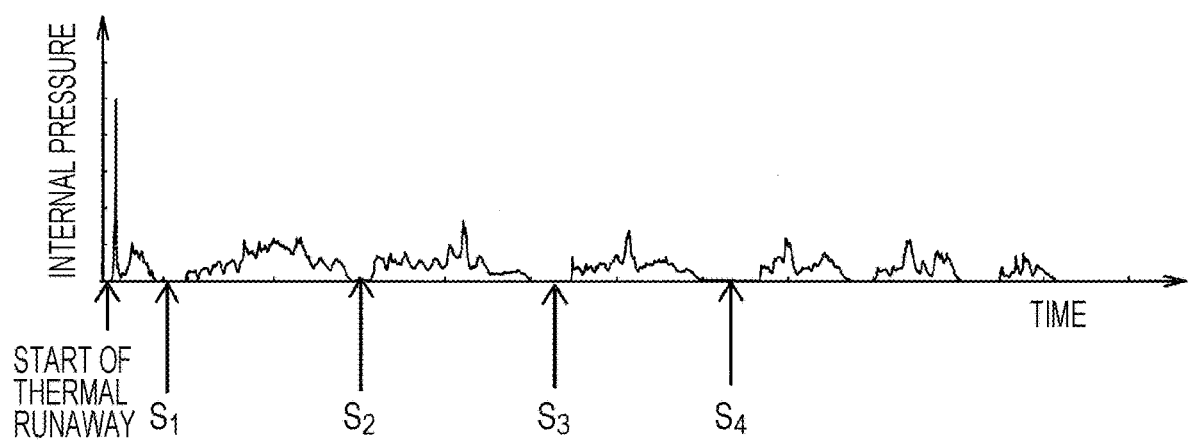
FIG. 11 is a graph for describing operation of the gas discharge mechanism according to the first embodiment over time in an example at the thermal runaway.

Therefore, the entry of air from the outside through the gas discharge port 51 is suppressed. Releasing the pressure in the case closes the gas discharge port; therefore, the entry of the air into the case is prevented. Thus, in the state where a calm occurs in the thermal runaway as illustrated in FIG. 11, for example, timings S1 to S4 when the air easily enters the battery case 30 due to the stack effect or wind are generated; however, the burning due to oxygen in the incoming air or gas explosion in the case can be suppressed. It can be said that the gas discharge mechanism G according to the present embodiment has a pressure responsive variable valve function by the simple structure as described above.

Figure 12:
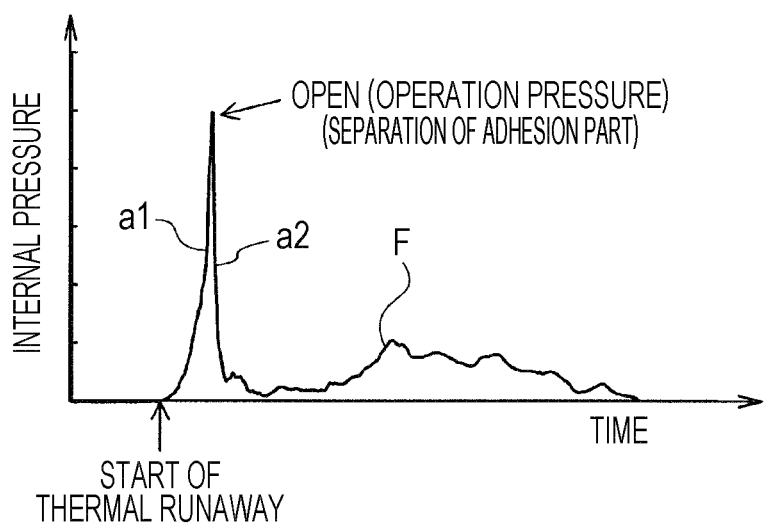
FIG. 12 is a magnified view of a part where the gas discharge mechanism performs the first opening operation in the graph in FIG. 11.
Figure 13:
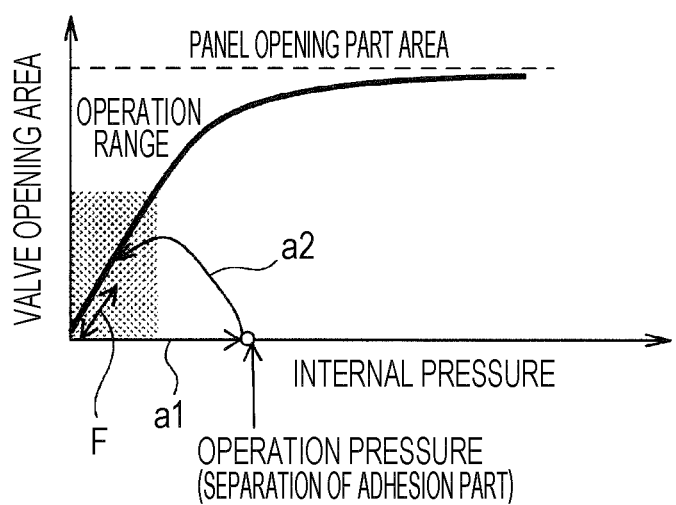
FIG. 13 is a graph for describing operation in which the gas discharge mechanism according to the first embodiment is opened and closed by changing a facing gap between a lid member and the wall plate in accordance with the internal pressure of the battery case.

Note that in the gas discharge mechanism G according to the present embodiment, the operation pressure at which the sealing material SG to be an adhesion part is separated and the gas discharge port 51 as the opening part opens is the peak value of the internal pressure in this example as illustrated in FIG. 12. Therefore, when the operation pressure is determined, it is preferable that the proper setting is obtained so that the sufficiently safe margin is secured in consideration of the pressure withstanding design value of the housing 10. Note that a part denoted by reference symbol a1 in the same drawing and FIG. 13 is in a state where the internal pressure is gradually increased due to the start of gas generation by thermal runaway. At the set operation pressure, the sealing material SG is separated and the gas discharge port 51 is opened. In addition, a part denoted by reference symbol a2 is in a state where the internal pressure instantly decreases because the gas accumulated in the housing is exhausted due to the opening of the gas discharge port 51 by the separation of the sealing material SG. In addition, a part denoted by reference symbol F is in the following state. That is to say, in this state, thermal runaway becomes intense and a large quantity of gas is generated; however, since the pressure release part includes the sufficient flow path area in the gas discharge port 51, the pressure shifts lower than the operation pressure at the separation of the sealing material SG and the operation as the variable valve is performed.

That is to say, as illustrated in the transition example of the opening area of the valve at the operation in FIG. 13, the pressure obtained when the internal pressure becomes high enough to separate the sealing material SG is the operation pressure and the operation is started (reference symbol a1). Then, once the gas discharge port 51 is opened, the open gas discharge port 51 releases the gas. Therefore, the internal pressure decreases.

Here, in the present specification, the term "operation pressure" refers to "the pressure when the gas discharge mechanism G shifts from the closed state to the open state". In particular, as described in the present embodiment, this corresponds to "the pressure at which the sealing material SG is separated and the gas discharge port 51 is opened" in the gas discharge mechanism G having the sealing material SG interposed therein. In the case of the gas discharge mechanism G that is formed by the close attachment between the opposing members without the sealing material SG, this pressure corresponds to the pressure at which the gas discharge port 51 opens for the first time regardless of the separation of the sealing material SG. In any case, once the gas discharge port 51 is opened, this corresponds to the internal pressure at which the operation as the variable value is performed.

In this manner, in the gas discharge mechanism G according to the present embodiment, the gas discharge port 51 is formed in the front panel 43 of the battery case 30 and the lid part 35$m$ covering the gas discharge port 51 from the inside of the front panel 43 is provided to the longitudinal frame 35 that is the frame member of the housing 10. Thus, when the front panel 43 swells due to the increase in internal pressure, the facing gap ΔT between the lid part 35$m$ and the periphery of the opening part of the front panel 43 can be increased without moving the lid part 35$m$.

Therefore, for example, when the pressure in the battery case 30 increases due to the thermal runaway of the battery 2, the gas in the battery case 30 can be discharged quickly with the sufficient discharge flow rate from a predetermined place, that is, from the gas discharge mechanism G. Then, when the internal pressure of the battery case 30 decreases after the gas is discharged, the plate shape of the front panel 43 returns to the original state. Thus, the gas discharge port 51 can be closed by the lid part 35$m$ again. In addition, the gas discharge mechanism G can be formed by a simple structure. As a result, the gas discharge mechanism G can be prepared at low cost.

In particular, in the present embodiment, the gas discharge port 51 of the front panel 43 is disposed at the position where the front panel 43 can be deformed to swell, at the center or its vicinity, which is away from the fastening part to the periphery of the frame where the front panel 43 is fastened by the wall plate set screw 50 (in particular, the center of the front panel 43 where the amount of swelling is the maximum is preferable).

Thus, by the structure according to the present embodiment, the center of the front panel 43 away from the wall plate set screw 50 easily swells outward when the internal pressure of the case increases. Therefore, this is preferable in securing the sufficient gas flow rate by increasing the facing gap ΔT between the lid part 35$m$ and the periphery of the opening part of the front panel 43 without moving the lid part 35$m$.

In the present embodiment, the longitudinal frame 35 is added as the frame member between the upper and lower frame members 15 and 32. Furthermore, the firm attachment of the upper and lower frame members 15 and 32 is performed through this longitudinal frame 35. Accordingly, this is preferable in securing the sufficient gas flow rate by increasing the facing gap ΔT between the lid part 35$m$ and the periphery of the opening part of the front panel 43 without moving the lid part 35$m$.

In the present embodiment, the front panel 43 where the gas discharge port 51 is formed is thinner than the opposing rear panel 42. Therefore, the wall plate on the side where the gas discharge mechanism G is disposed (that is, the front panel 43 in this example) swells relatively easily to the outside. Thus, the facing gap ΔT between the lid part 35$m$ and the periphery of the opening part of the front panel 43 can be increased without moving the lid part 35$m$. Accordingly, it can be said that the excellent structure in securing the sufficient gas flow rate is obtained.

In addition, in the present embodiment, the surface of the lid part 35$m$ is attached to the periphery of the gas discharge port 51 using a liquid gasket as the sealing material so as to close the gas discharge port 51 of the front panel 43. Therefore, this is suitable in preventing the entry of external foreign substances through the gas discharge port 51 when the gas discharge port 51 is closed.

As described above, this battery case 30 has the structure including the gas discharge mechanism G, and this gas discharge mechanism G includes the gas discharge port 51 that opens in the front panel 43 among the wall plates that cover the periphery of the housing 10, and the lid part 35*m* that is disposed to cover the gas discharge port 51 from the inside of the front panel 43 and is fixed on the housing side. Therefore, the gas discharge mechanism can be formed by the simple structure.

This gas discharge mechanism G is opened and closed by changing the facing gap ΔT between the lid part 35*m* and the front panel 43 in a manner that the front panel 43 is deformed to swell outward in accordance with the internal pressure of the battery case 30 while the external surface of the longitudinal frame 35 to become the lid part 35*m* is not moved. Therefore, while the gas discharge mechanism is formed by the simple structure, enough gas discharge flow rate can be secured.

In the example described in the first embodiment, the frame that forms the housing is also used as the lid part 35*m*. Alternatively, in another example to be described below in a second embodiment, a lid member different from the frame on the housing side may be exclusively disposed as the lid part.

Next, in the first embodiment, one example of the attaching part is described regarding the attachment structure to a vehicle as an equipment object to which the battery case 30 is to be provided (state in which it is attached to the vehicle body). As FIG. 14 illustrates the attaching part, this example shows that a pack attaching member A formed by a C channel provided on the vehicle side is used as a panel displacement restriction member. In this drawing, however, the illustration of the sealing material is omitted (however, the sealing material is interposed (similar to FIG. 15)).

Note that the panel displacement restriction member is not limited to the pack attaching member A on the vehicle body side and may be another component on the vehicle body side. When attached to the vehicle, it is preferable that the surface on the gas discharge side faces in the direction different from the passenger's seat side (for example, in FIG. 14 and FIG. 15, the side indicated by an arrow M is preferably the passenger's seat side).

In this example, the surface of the front panel 43 in the first embodiment described above is the attaching part of the battery case 30 to the vehicle body. The front panel 43 includes a plurality of (in the first embodiment, nine) stud nuts 53. In addition, the gas discharge mechanisms G are provided at three positions, at the center and on the left and right sides.

Each stud nut 53 in the first embodiment includes a ring-shaped brim part 53*t*, and a cylindrical part 53*b* having a female screw 53*a* formed inside. The diameter of the brim part 53*t* is necessarily and sufficiently smaller than the inner diameter of the gas discharge port 51. As illustrated in FIG. 1 and FIG. 6, the part of the stud nut 53 that is disposed at the position of the gas discharge mechanism G is fixed by welding or the like at the coaxial position with the gas discharge port 51 on the external surface of the longitudinal frame 35 in the housing 10 (that is, the surface functioning as the lid part 53*m*). In addition, the three positions are fixed to the upper and lower frames of the housing 10 by welding or the like.

Additionally, as illustrated in FIG. 14, in the battery case 30, the surface of the front panel 43 is fixed to the pack attaching member A on the vehicle body side in a manner that a bolt B is screwed into each stud nut 53. In this example, the bolt B and the stud nut 53 are fixed with a spacer S interposed therebetween.

As FIG. 15 illustrates the state in the operation, the pack attaching member A on the vehicle body side restricts the amount of swelling of the front panel 43 on the vehicle body side. Accordingly, the amount of displacement of the front panel 43 due to swelling after the gas discharge port 51 is opened is restricted. By restricting the amount of displacement of the front panel 43, the separation at the edge of the front panel 43 can be prevented. Note that a white arrow in this drawing indicates the image in which the front panel 43 moves outward due to swelling.

In this example, when the gas is discharged, a part of the gas discharge path (image indicated by an arrow Ga in FIG. 15) is blocked by the pack attaching member A on the vehicle body side. Therefore, when the gas is discharged, the upper surface of the pack attaching member A on the vehicle body side restricts the amount of shift of the front panel 43 after opening. By restricting the amount of displacement of the front panel 43, the separation of the panel edge part can be prevented.

In a case of securing the flow rate at the high pressure more sufficiently, it is preferable to provide a plurality of (in the above example, three) gas discharge mechanisms G as described in the first embodiment. Note that the three gas discharge mechanisms do not necessarily have to be opened to the same degree. The amount of opening by the restriction member may be varied depending on the portion where each gas discharge mechanism is disposed in accordance with the layout of the module in the battery case 30.

Here, in the case of providing the three gas discharge mechanisms G as described in the first embodiment, the first gas discharge mechanism at the center where the bending occurs the most easily is opened first. When the amount of displacement of the first gas discharge mechanism is restricted and because of that, the opening area is not enough to release the pressure, the second gas discharge mechanism and the third gas discharge mechanism at the two positions on both sides are opened.

In the case of such a mechanism in the present example, the pack attaching member A can prevent the first gas discharge mechanism at the center from being too open. When the internal pressure of the case is very high, the amount of opening the three gas discharge mechanisms can be set based on the contact position with the pack attaching member A so that these amounts coincide (however, the timing when the gas discharge mechanisms are fully open is different depending on how easily the front panel 43 bends at the position where each gas discharge mechanism is disposed on the front panel 43).

Second Embodiment

Next, a second embodiment is described with reference to FIG. 16 to FIG. 19. The basic structure of the battery incorporated in the battery case in the second embodiment is the same as that of the battery case 30 in the first embodiment except that the size of the battery to house is different and accordingly the case is formed to have a flat box shape. Therefore, in the second embodiment, just the part of the battery case is illustrated and the description of the battery to be incorporated in the battery case is omitted. The structure similar to, or corresponding to that of the first embodiment described above is denoted by the same reference symbol and the description thereof is omitted as appropriate.

Figure 16:
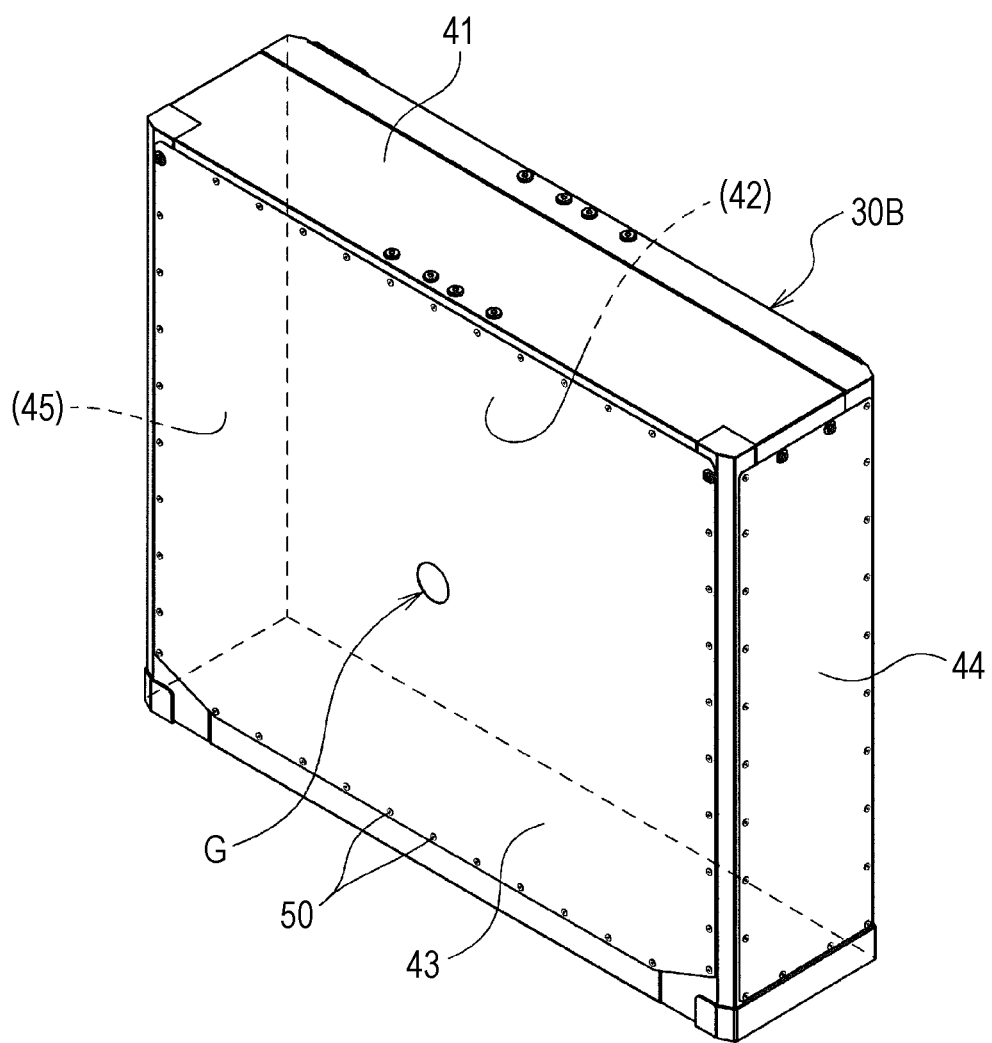
FIG. 16 is a schematic perspective view of a battery case according to a second embodiment.

Here, a battery case 30B according to the second embodiment includes the gas discharge mechanism G at one position as illustrated in FIG. 16. The gas discharge mechanism G includes a lid member 52 and the gas discharge port 51 that opens in the front panel 43 of the wall plates that cover the periphery of the housing 10. The lid member 52 is disposed to cover the gas discharge port 51 from inside the front panel 43 and is fixed to a beam member 35 that is the frame member of the housing 10. Since the beam member 35 according to the second embodiment is the frame member corresponding to the longitudinal frame 35 in the first embodiment, the same reference symbol is added in the description.

Figure 17:
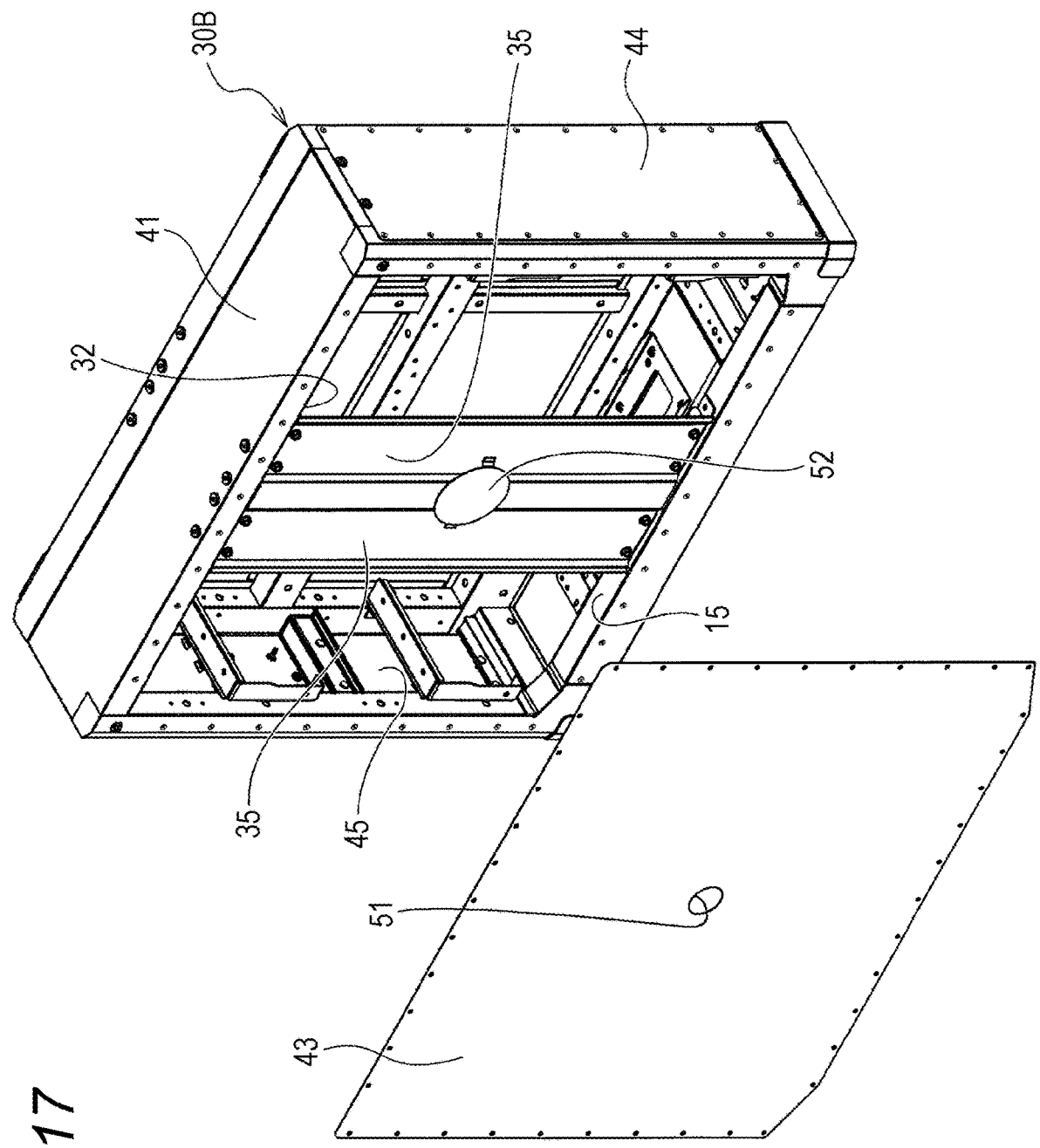
FIG. 17 is a schematic perspective view of the battery case according to the second embodiment, illustrating a state in which the wall plate including the gas discharge mechanism is detached.

The gas discharge mechanism G includes the lid member 52 with a plate shape and the gas discharge port 51 with a circular shape that is opened in the front panel 43 as illustrated in an exploded perspective view in FIG. 17. The lid member 52 is attached to the beam member 35 that is disposed to face along the inner surface of the front panel 43 so as to cover the gas discharge port 51. Accordingly, the lid member 52 is fixed to the frame member of the housing 10 or the member that is stronger than the front panel 43 in the battery case 30.

In the example in the second embodiment illustrated in FIG. 16, the outer shape of the battery case 30B is a substantially rectangular parallelepiped shape. The front panel 43 is disposed on the surface with the maximum area among the six surfaces of this rectangular parallelepiped shape. The gas discharge mechanism G is disposed on the front panel 43.

In the second embodiment, the lid member 52 is disposed at a central concave part between the two beam members 35, which are the frame members of the housing 10 and of which convex parts are stepped. The lid member 52 is fixed extending between the adjacent two beam members 35 in such a way that attaching parts 52j that stretch out in the left-right direction are welded to the left and right convex beam members 35. In a manner similar to the first embodiment, the beam member 35 may be formed by a plurality of frame members. In addition, the gas discharge mechanism G can be provided at an arbitrary position on the wall plates 41 to 46 surrounding the periphery of the housing 10 in a manner similar to the first embodiment.

Figure 18:
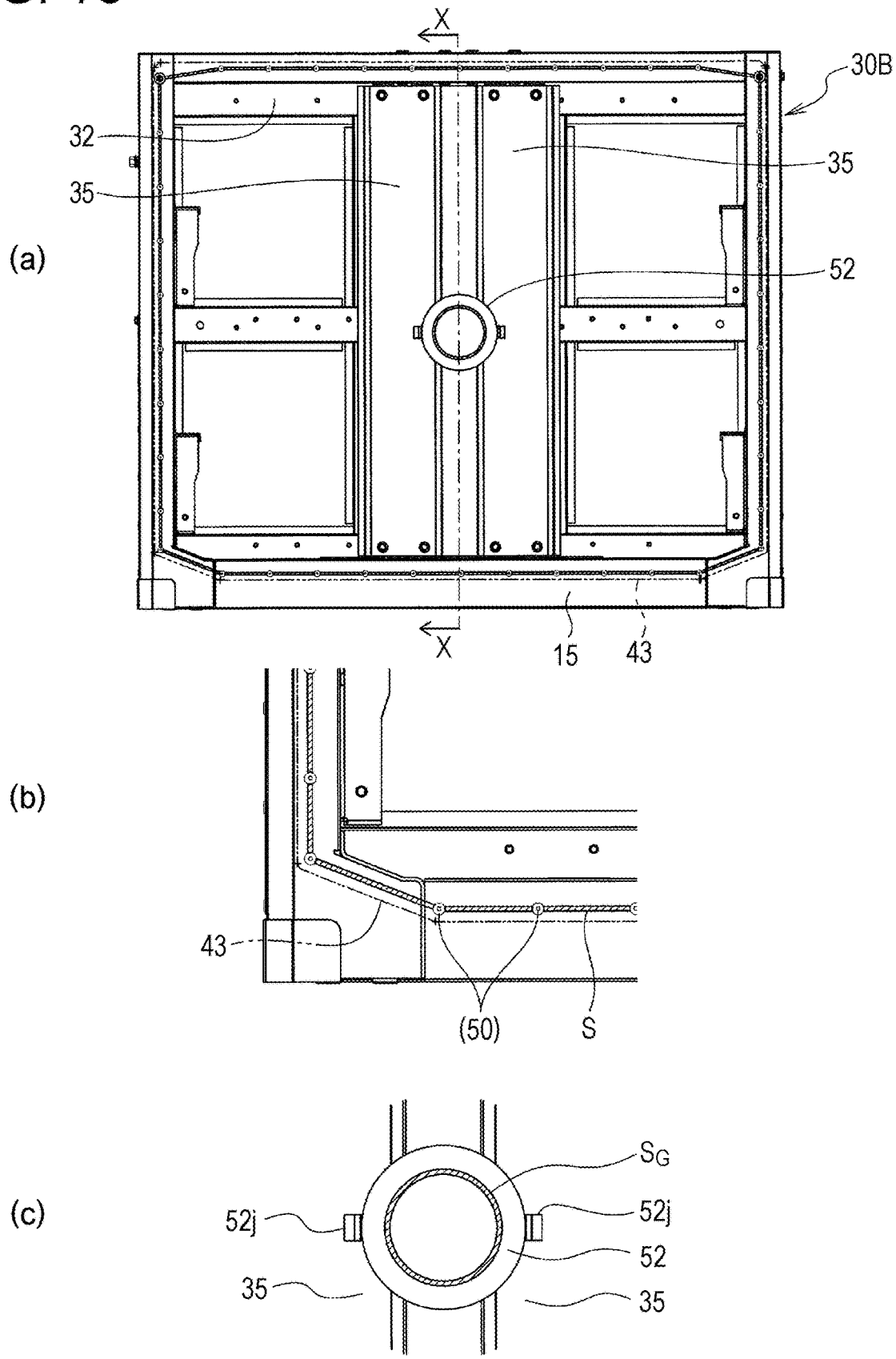
FIG. 18(a) is a schematic front view of the housing in the battery case according to the second embodiment.
FIG. 18(b) is a magnified view of a sealing part around the wall plate in FIG. 18(a)
FIG. 18(c) is a magnified view of the lid part of the gas discharge mechanism in FIG. 18(a).

As illustrated in FIG. 18, the space between the rear surface of the front panel 43 around the circular gas discharge port 51 and the opposing surface of the lid member 52 in each gas discharge mechanism G is sealed by the suitable sealing material SG such as a liquid gasket as an alternative to the seal S around the front panel 43.

The lid member 52 is formed by a circular flat steel plate of which diameter is larger than that of the gas discharge port 51 by the amount of sealing part to which the sealing material SG is applied. It is desirable that the lid member 52 is not deformed by the pressure inside the housing 10. In the second embodiment, the lid member 52 is formed using a steel plate thicker than the material of the front panel 43.

The lid member 52 is disposed to face the gas discharge port 51 so that the center of the lid member 52 coincides with the center of the gas discharge port 51. The both are bonded together with the sealing material SG. Thus, the housing 10 is substantially sealed so that the entry of rain water, dust, or the like from the outside can be prevented.

The opening area of the gas discharge port 51 is set to be the suitable size in accordance with the capacity or the like of the battery pack 1 in a manner similar to the first embodiment. Note that the gas discharge port 51 and the lid member 52 are formed to be circular in the present embodiment; however, the shape may be any shape such as a rectangular, hexagonal, or octagonal shape.

Figure 19:
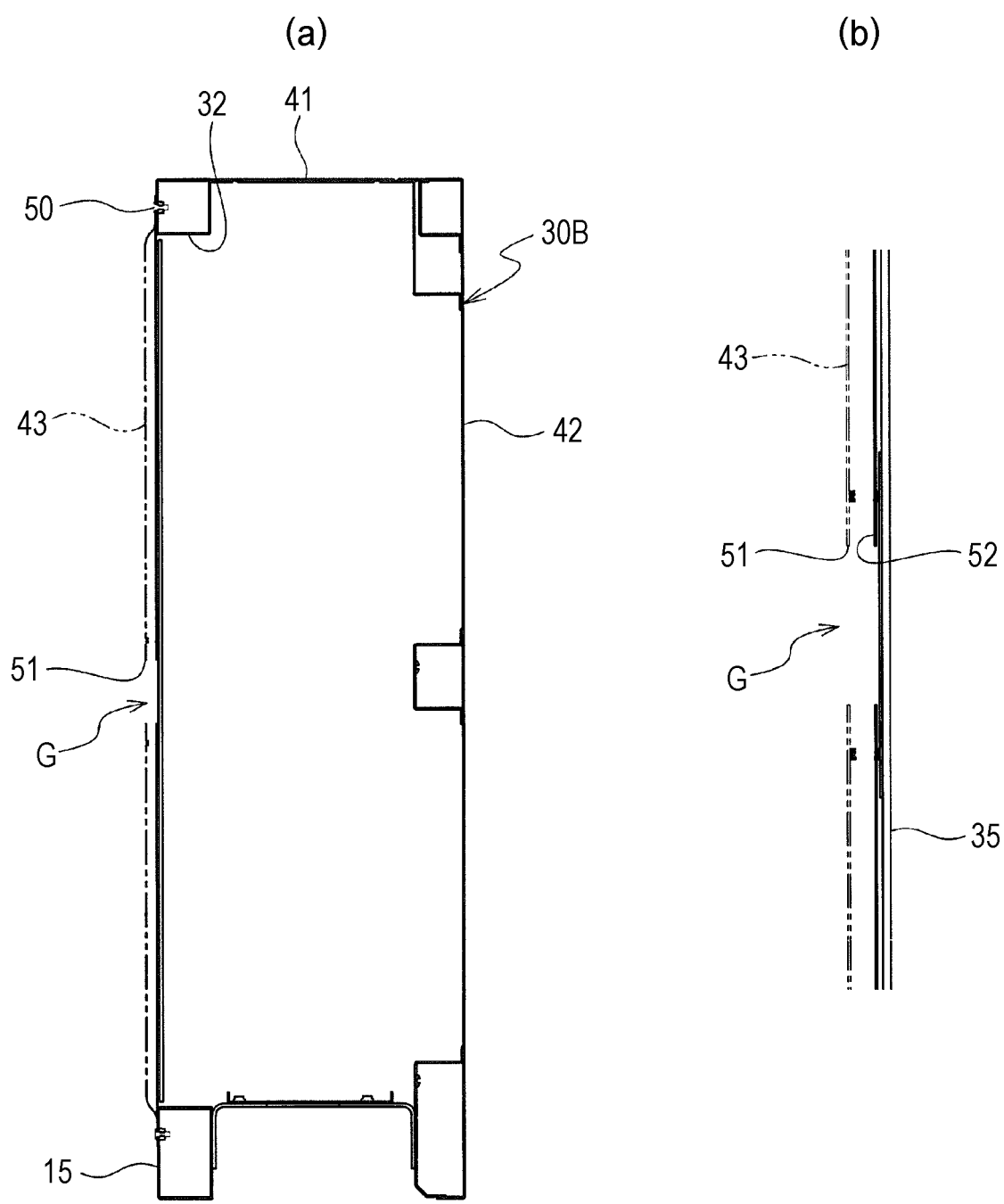
FIG. 19(a) is a cross-sectional view taken along X-X in FIG. 18.
FIG. 19(b) is a magnified view of a main part of the gas discharge mechanism in FIG. 19(a), in which the image of the wall plate at the operation is illustrated with a two-dot chain line.

Accordingly, when the internal pressure is increased, the front panel 43 swells outward and the rear surface of the front panel 43 is separated from the lid member 52 as illustrated in FIG. 19. As a result, the internal gas is discharged from the facing gap ΔT therebetween. The lid member 52 itself is stronger than the front panel 43 and the lid member 52 is fixed to the beam member 35 on the housing side that is stronger than the front panel 43. Therefore, in a manner similar to the first embodiment, when the gas is discharged, the facing gap ΔT is generated by the amount of outward swelling of the front panel 43 while the lid member 52 is hardly moved. Accordingly, the gas discharge flow rate can be secured sufficiently.

Here, the results of summarizing the operation effects based on comparison with other gas discharge mechanisms similar to the gas discharge mechanism according to the present invention are expressed in Table 1. In this table, a conventional example 1 corresponds to an example including a pressure release mechanism using a rupture disk (for example, Japanese Patent No. 5803553). A conventional example 2 corresponds to an example including the pressure release part disclosed in Patent Literature 1 described above. A comparative example corresponds to an example in which gas is discharged by separating the sealing part at the edge of the wall plate. Here, as this table indicates, four items are considered as the operation effects to compare: (1) open/close state of pressure release part, (2) opening area (gas release capability) of pressure release part, (3) external ignition, and (4) possibility of decrease of closing pressure releasing function. Note that, at the thermal runaway, a large amount of flammable gas is released from the battery. This gas is released out of the housing through the pressure release part.

TABLE 1

| | Conventional example 1 | | Conventional example 2 | | Comparative example | | The present invention | |
|---|---|---|---|---|---|---|---|---|
| Pressure release part | Keep open | Poor | Keep open after buckling | Average | Keep open after buckling | Average | Buckling is difficult because of simple mode | Good |
| Opening area Gas release capability | Large | Good | Small Amount of lifting cannot be used effectively | Poor | Medium Amount of lifting cannot be used effectively | Average | Large Amount of lifting can be used effectively | Good |
| Direct release of fire sparks Possibility of external ignition | Easy | Poor | Hard | Good | Hard | Good | Hard | Good |
| Decrease of closing pressure releasing function due to dust | Hard | Good | Easy | Poor | Medium | Average | Hard | Good |

As indicated in this table, first, in the conventional example 1, the pressure release part (rupture disk) is ruptured by the internal pressure; therefore, after the pressure release part is ruptured, the release is maintained as a matter of course. At the release due to the rupture, the opening part becomes relatively large.

Therefore, particles with high temperature (sparks of fire) released from the battery due to thermal runaway easily go out through the opening part of the pressure release part. The particles with high temperature (sparks of fire) become the ignition cause and increase the risk of igniting the flammable gas released from the opening part. In particular, when the internal structure is viewable from the opening part, as a result, the outside becomes easier to burn. However, since the opening part is relatively large, the gas release capability at the release can be secured more easily. In addition, even if a large amount of dust such as the internal battery active material is generated, when the pressure release part is widely ruptured, the closing pressure releasing function deteriorates less easily.

Next, in the conventional example 2 (Patent Literature 1), the sparks of fire are not easily released. In this structure, however, when the pressure release part is opened with the internal pressure, the lid member moves together with the wall plates to the outside as described above. Therefore, the gap as small as the amount of deformation of the wall plates is generated and enough gas discharge flow rate may not be secured. In particular, since the housing has the structure formed by the panel pressing mold, the gap tends to be smaller than the amount of displacement of the panel due to the internal pressure.

Furthermore, since the opening part is relatively small, the gas release capability at the release may be insufficient. In addition, in a case where a large amount of dust such as the internal battery active material is generated, the pressure release part may be closed and the pressure releasing function may deteriorate. Moreover, since the housing has the structure formed by the panel pressing mold, the panel easily buckles and after the panel buckles, the opening part keeps open.

Next, in the comparative example, in the case where the gas is discharged by the separation of the sealing part at the edge of the wall plate, the wall plate may buckle. After the wall plate buckles, the opening part keeps open. The gap in the opening part may become smaller than the amount of lifting by the wall plate that buckles due to the internal pressure.

On the other hand, in the battery case according to the present invention as described in detail on the basis of the embodiments above, the gas discharge mechanism G has a simple mode including the gas discharge port that opens in the wall plates covering the periphery of the housing, and the lid part that is disposed to cover the gas discharge port from the inside of the wall plate and fixed to the housing side. Therefore, the buckling due to the swelling deformation occurs less easily and the swelling deformation in the range of the elastic deformation can be achieved. Accordingly, the gas discharge port can be closed when the internal pressure decreases. That is to say, the pressure release part can be opened/closed in accordance with the internal pressure.

The gas discharge mechanism G according to the present invention is configured to be opened and closed by changing the facing gap between the lid part and the wall plate in a manner that only the wall plate is deformed to swell outward in accordance with the internal pressure of the battery case 30 while the lid part is not moved. Therefore, the mount of lifting at the swelling deformation can be efficiently used as the gas opening area. Accordingly, the structure is simple and the gas releasing capability is higher than that in the conventional examples 1 and 2 and the comparative example.

In addition, by changing the facing gap between the lid part and the wall plate, the opening/closing is performed; thus, the excellent gas discharge mechanism as below can be provided. That is to say, in this gas discharge mechanism, the particles with high temperature (sparks of fire) released from the battery due to thermal runaway do not easily go out through the opening part. In addition, even if a large amount of dust such as the internal battery active material is generated, there is no risk that the pressure release part is closed and the pressure releasing function deteriorates.

The battery case according to the present invention is not limited to the above embodiments. Various modifications are possible without departing from the concept of the present invention. For example, in the above embodiments, the battery pack 1 including the battery case 30 according to the present invention is used for the on-vehicle power source device in the electric vehicle or the hybrid vehicle. The use of the battery case according to the present invention is not limited to the on-vehicle power source device in the electric vehicle or the hybrid vehicle and may be various power source devices including a fixed type energy storage device, for example. Moreover, in the example of the battery pack 1 according to the above embodiments, two stacks are stacked in the battery case 30. Alternatively, the battery pack 1 may be formed by one stack or a stack of three or more stacks.

In the example described in the above embodiments in which the gas discharge mechanism G is formed by the simple structure, the gas discharge port is circular in shape; however, the shape is not limited thereto. That is to say, the gas discharge mechanism according to the present invention may have various modes as long as including the gas discharge port that opens in the wall plate covering the periphery of the housing, and the lid part that is disposed to cover the gas discharge port from the inside of the wall plate and fixed to the frame member of the housing or the strong member inside the housing, and being configured to be opened and closed by changing the facing gap between the lid member and the (corresponding) wall plate in a manner that (the same or another) wall plate is deformed to swell outward in accordance with the internal pressure of the battery case while the lid part is not moved (relatively).

Modifications of the gas discharge mechanism according to the present invention are described below. Here, for example, in the first and second embodiments, the gas discharge port to serve as the pressure release part and the sealing part by the sealing material surrounding the gas discharge port are circular in shape. The shape is not limited to the circular shape and the shape of the gas discharge port and the sealing part may be, for example, suitable shapes including an elliptical shape, a square shape, a rectangular shape with rounded corners, and a rhombus shape.

The number of gas discharge mechanisms is not limited either and may be more than one as described in the first embodiment or may be one as described in the second embodiment. The position where the gas discharge mechanism is disposed is not limited to the position at the center of the wall plate and may be an offset position (denoted by reference symbol Os in FIG. 7) that is off (offset) from the center position. When the gas discharge mechanism is offset from the center of the wall plate, the sealing material is separated from the center side of the wall plate at the sealing part; therefore, the gas discharge port is easily opened.

Regarding the wall plate where the gas discharge mechanism is provided, the fastening is not limited to the screw fastening and the wall plate may be fixed to the frame by adhesion instead of by the fastening structure. Alternatively, the wall plate can be fixed to the frame by various fixing means such as adhesion, pasting, welding, bonding, rivet, or a double-sided tape. The wall plate and the frame, which are fixed directly, may alternatively be fixed through another member.

The interposition of the sealing material in the gas discharge mechanism is one of the reliability requirements and is not necessarily the required component in the present invention. For example, in the case where the fixing is carried out and the installation in a room that is not directly exposed to wind or rain is performed, the sealing material does not need to be interposed. The liquid seal may be replaced by another sealing material, packing, or the like. In the case where the sealing material is interposed, the degree of adhesion by sealing can be set variously. In other words, in the case where the sealing material is interposed in the gas discharge mechanism, in the occurrence of abnormality of increased internal pressure, it is only necessary that the sealing surface is separated before the housing is ruptured.

Figure 20:
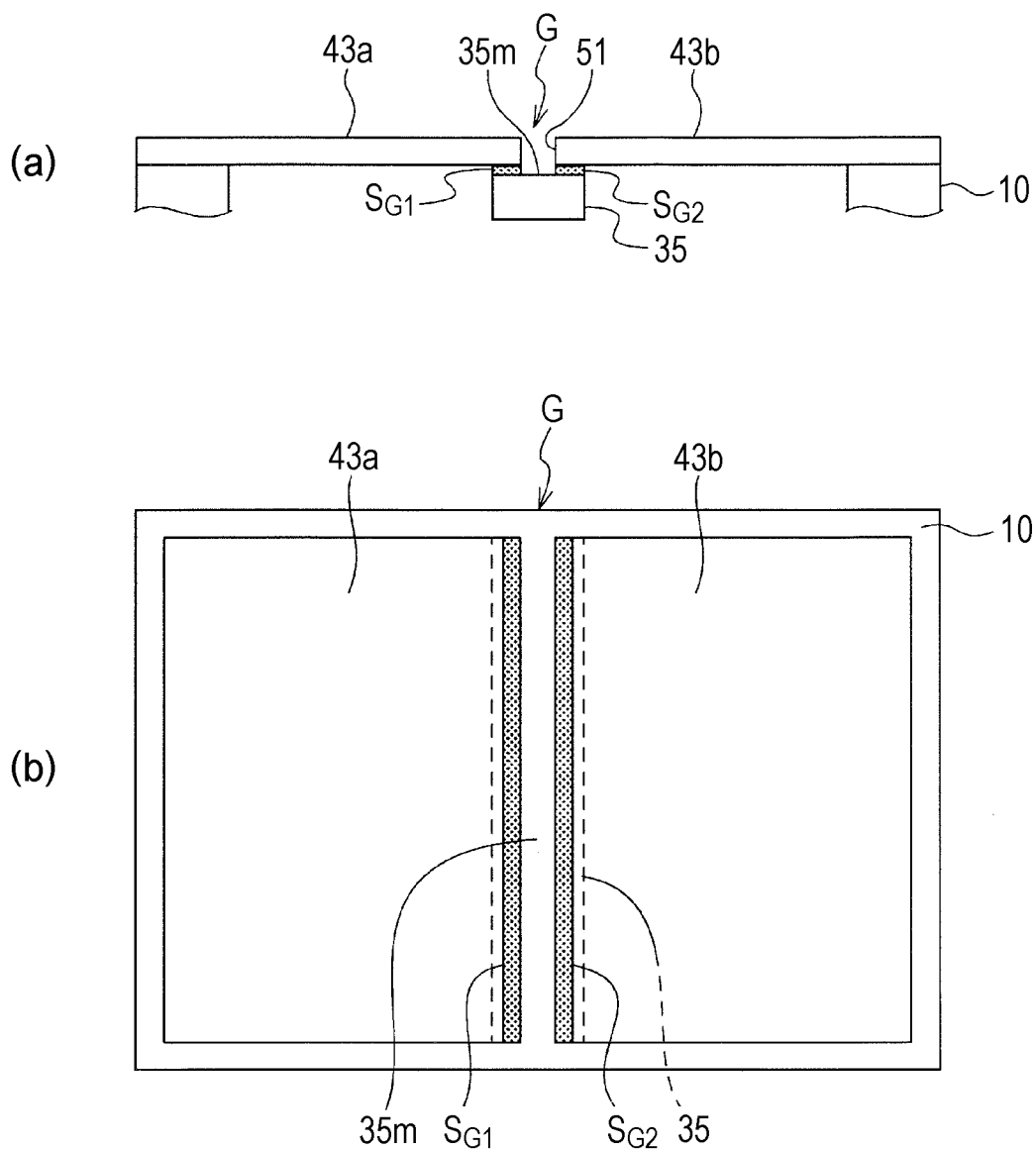
FIG. 20(a) is a schematic front view and FIG. 20(b) is a schematic plan view, both for describing a first modification of the gas discharge mechanism in the battery case according to one aspect of the present invention.

The wall plate where the gas discharge mechanism is provided is not limited to one wall plate and may be formed by cooperation of a plurality of wall plates. In another example of the gas discharge mechanism G, the gas discharge port may be formed using a side of the panel. Specifically, in a first modification illustrated in FIG. 20, a plurality of panels (for example, two panels) can be used. In this example, two panels 43a and 43b are disposed apart from each other in opposite directions at a center of the housing 10 as the wall plate (front panel 43) covering one surface of the battery case 30. By the mutual cooperation, the parts separated in the opposite directions are provided in a portion between sides of the two panels 43a and 43b as the gas discharge port 51. In other words, the wall plate (front panel 43) covering one surface of the battery case has a split structure including the panel 43a and the panel 43b. Between the panel 43a and the panel 43b, the gas discharge port 51 is provided. In other words, the gas discharge port 51 is formed not just by the panel 43a. By the cooperation of the panel 43a and the panel 43b, the gas discharge port 51 is open between the panel 43a and the panel 43b.

At this gas discharge port 51, the frame member 35 of the housing 10 is disposed to cover from the rear surface of the panels 43a and 43b. Between the rear surface of the two panels 43a and 43b and the outer surface 35m of the frame member 35, sealing materials SG1 and SG2 are interposed.

Even in this structure, when the wall plates 43a and 43b are deformed swelling outward due to the increased internal pressure, only the wall plates 43a and 43b can be moved outward while the lid part 35m is not moved. Accordingly, the facing gap between the lid part 35m and the periphery of the gas discharge port 51 on the wall plates 43a and 43b can be made large. Thus, when the pressure in the case becomes high, enough gas discharge flow rate can be secured.

Figure 21:
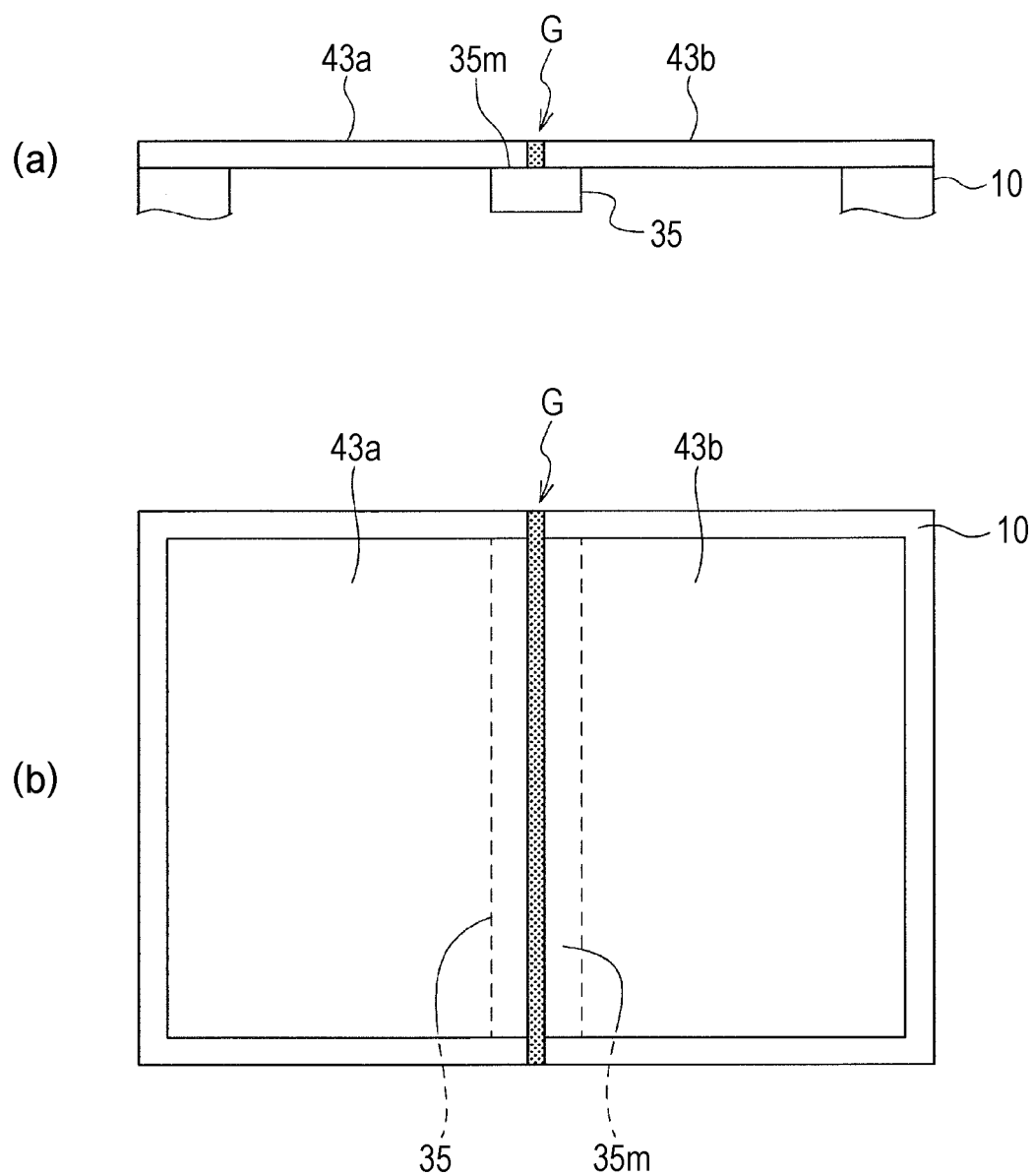
FIG. 21(a) is a schematic front view and FIG. 21(b) is a schematic plan view, both for describing a second modification of the gas discharge mechanism in the battery case according to one aspect of the present invention.

In the case of forming the sealing, various modes can be employed in addition to the example of the interposition between the wall plates and the lid part. For example, in a second modification illustrated in FIG. 21, the two panels 43a and 43b are disposed apart from each other with a slit-like gap, which is smaller than the gap in the above example, in the opposite directions at the center position of the housing 10. By the mutual cooperation, the parts separated in the opposite directions are provided in a portion between the sides of the two panels 43a and 43b as the gas discharge port 51.

The frame member 35 of the housing 10 is disposed to cover this gas discharge port 51 from the rear surface of the panels 43a and 43b. The sealing is formed by filling, with the sealing material SG, a concave part formed by a space between the two panels 43a and 43b and the outer surface 35m of the frame member 35.

Even in this structure, when the wall plates 43a and 43b are deformed swelling outward due to the increased internal pressure, only the wall plates 43a and 43b can be moved outward while the lid part 35m is not moved. Accordingly, the facing gap between the lid part 35m and the periphery of the gas discharge port 51 on the wall plates 43a and 43b can be made large. Thus, when the pressure in the case becomes high, enough gas discharge flow rate can be secured.

In a third modification illustrated in FIG. 22, one panel 43 is used. On this panel 43, at a center position of the housing 10, cutoff parts that open at upper and lower sides in the same drawing are formed. The cutoff parts are formed at two positions each as the gas discharge port 51. At each gas discharge port 51, the frame member 35 of the housing 10 is disposed to cover from the rear surface of the panel 43. The sealing material SG is interposed between the rear surface of the panel 43 and the outer surface 35m of the frame member 35.

Even in this structure, when the wall plate 43 is deformed swelling outward due to the increased internal pressure, only the wall plate 43 can be moved outward while the lid part 35m is not moved. Accordingly, the facing gap between the lid part 35m and the periphery of the two gas discharge ports 51 on the wall plate 43 can be made large. Thus, when the pressure in the case becomes high, enough gas discharge flow rate can be secured.

The wall plate where the gas discharge mechanism is provided is not limited to the flat plate shape and may have a bent structure as illustrated in FIG. 23. In a fourth modification illustrated in FIG. 23(a), the two panels 43a and 43b are used as the wall plate (front panel 43) covering one surface of the battery case 30. One panel 43a has a flat plate shape and the other panel 43b includes a bent part 43d. On the two panels 43a and 43b, the periphery excluding the opposing sides is fixed on the housing side 10 with a set screw or the like. Between an end of one panel 43a and an end surface of the bent part 43d in the other panel 43b, a gap is provided. Accordingly, the gap between the opposing parts is configured to function as the gas discharge port 51. In this example, "at least one wall plate" has a split structure and the panels 43a and 43b correspond to "the at least one wall plate".

The other panel 43b has a bent shape so that an end part 52 thereof overlaps from the rear surface side of the one panel 43a. The other panel 43b is supported by the frame member 35 from the rear surface side. Between the rear surface of the end part of the one panel 43a and an upper surface of the end part 52 of the other panel 43b, the sealing material SG is interposed. Thus, the other panel 43b has higher rigidity by the bent structure and moreover the end part 52 functions as the lid part. That is to say, in this example, the other panel 43b corresponds to "the member provided on the housing side and being stronger than the at least one wall plate".

In a fifth modification illustrated in FIG. 23(b), the two panels 43a and 43b are used. At an end part of the one panel 43a, a bent part 43e is provided. The other panel 43b has a flat plate shape. The two panels 43a and 43b are fixed by a set screw or the like on the housing 10 side along the periphery excluding the opposing sides. The other panel 43b is supported by the frame member 35 from the rear surface side.

Between an end surface 51 of the bent part 43e of the one panel 43a and the end surface of the other panel 43b, a gap is provided. Thus, the gap between the opposing parts is configured to function as the gas discharge port 51. In other words, in this example, the one panel 43*a* corresponds to "the at least one wall plate". In this example, in order to adjust the rigidity, a thin plate is used as the one panel 43*a* including the bent part 43*e*. As the other panel 43*b*, a thick plate is used so as to have relatively large rigidity compared to the one panel 43*a*.

In the other panel 43*b*, the end part 52 is disposed to overlap from the rear surface of the bent part 43*e* of the one panel 43*a*. Between the rear surface of the end part of the one panel 43*a* and the upper surface 52 of the end part of the other panel 43*b*, the sealing material SG is interposed. Thus, in the other panel 43*b*, the rigidity is increased by the thick plate and the upper surface 52 of the end part functions as the lid part. That is to say, in this example, the other panel 43*b* corresponds to "the member provided on the housing side and being stronger than the at least one wall plate".

In providing the outward swelling deformation on purpose, it is preferable to decrease the spring constant against the internal pressure on the outward swelling side by varying the plate thickness, varying the rigidity by the bending shape, varying the pressure receiving area, or varying the distance from a supporting point as described above.

LIST OF REFERENCE SIGNS

1 Battery pack
2 Battery
2*a* Positive electrode terminal
2*b* Negative electrode terminal
3*d* Stack in the first stage
3*u* Stack in the second stage
4 End plate
5 Bus bar
6 Attachment screw
8 Junction box
10 Housing
11 Columnar supporting member (main frame)
12 Columnar member (main frame)
13 First beam member (main frame)
14 Second beam member (main frame)
15 Second fundamental beam member (main frame)
16 First brace
17 Second brace
18 First fixing member
19 Attachment screw
20 Second fixing member
21 Attachment screw
30 Battery case
31 Wall plate attachment angle (subframe)
32 Wall plate attachment angle (subframe)
33 Wall plate attachment angle (subframe)
34 Wall plate attachment angle (subframe)
35 Longitudinal frame
35*m* Lid part
41 to 46 Wall plates (cover panels)
42 Rear panel (wall plate opposing gas discharge mechanism)
43 Front panel (wall plate where gas discharge mechanism is provided)
50 Wall plate set screw (fastening part)
51 Gas discharge port
52 Lid member
53 Stud nut
C Connector
RL1, RL2 Relays
S Sealing material
SL Sealing line
H Harness (conductive path)
T Crimped terminal
W Electric wire
G Gas discharge mechanism
Os Offset

The invention claimed is:

1. A battery case including a housing in which a battery is housed, and a plurality of wall plates that covers a periphery of the housing, the housing comprising a frame member, the battery case comprising a gas discharge mechanism including a gas discharge port that opens in at least one of the plurality of wall plates, and a lid part that is disposed to cover the gas discharge port from inside the at least one wall plate and is fixed on a side of the housing, wherein the gas discharge mechanism is configured to cause the at least one wall plate to separate from the lid part by outward swelling deformation of the at least one wall plate in accordance with increase of internal pressure of the battery case so that a facing gap is formed between the lid part and the at least one wall plate while the lid part remains fixed to the side of the housing, and accordingly discharge gas in the battery case through the facing gap and the gas discharge port, wherein:
the lid part is provided on the side of the housing and is stronger than the at least one wall plate, and the frame member of the housing also serves as the lid part, or
the lid part is a lid member that is fixed to a member that is fixed to the frame member of the housing.

2. The battery case according to claim 1, wherein
the gas discharge mechanism opens the gas discharge port by forming the facing gap between the lid part and the at least one wall plate when the internal pressure of the battery case exceeds an external air pressure by more than a predetermined value,
when the internal pressure is increasing after the gas discharge port is opened, the gas discharge mechanism changes the facing gap so as to become larger as the internal pressure is increasing, and when the internal pressure is decreasing after the gas discharge port is opened, the gas discharge mechanism changes the facing gap so as to become smaller as the internal pressure is decreasing, and
when the internal pressure is released, the gas discharge mechanism operates so that the at least one wall plate moves to a side of restoring to an initial shape and closes between the lid part and the at least one wall plate.

3. The battery case according to claim 1, wherein a sealing material is interposed between opposing surfaces of the lid part and the at least one wall plate.

4. The battery case according to claim 1, wherein the gas discharge mechanism is provided at a center position of the at least one wall plate.

5. The battery case according to claim 1, wherein the gas discharge mechanism is provided at an offset position that is off a center position of the at least one wall plate.

6. A battery case including a housing in which a battery is housed, and a plurality of wall plates that covers a periphery of the housing, the battery case comprising a gas discharge mechanism including a gas discharge port that opens in at least one of the plurality of wall plates, and a lid part that is disposed to cover the gas discharge port from inside the at least one wall plate and is fixed on a side of the housing, wherein the gas discharge mechanism is configured to cause the at least one wall plate to separate from the lid part by outward swelling deformation of the at least one wall plate in accordance with increase of internal pressure of the battery case so that a facing gap is formed between the lid part and the at least one wall plate while the lid part remains fixed to the side of the housing, and accordingly discharge gas in the battery case through the facing gap and the gas discharge port, wherein:

a plurality of the gas discharge mechanisms is provided at a plurality of positions, the gas discharge mechanisms include a first gas discharge mechanism that is provided at a center part of the at least one wall plate and a second gas discharge mechanism that is provided at a part of the at least one wall plate other than the center part, and the first gas discharge mechanism opens first and then, the second gas discharge mechanism opens.

7. A battery case including a housing in which a battery is housed, and a plurality of wall plates that covers a periphery of the housing, the battery case comprising a gas discharge mechanism including a gas discharge port that opens in at least one of the plurality of wall plates, and a lid part that is disposed to cover the gas discharge port from inside the at least one wall plate and is fixed on a side of the housing, wherein the gas discharge mechanism is configured to cause the at least one wall plate to separate from the lid part by outward swelling deformation of the at least one wall plate in accordance with increase of internal pressure of the battery case so that a facing gap is formed between the lid part and the at least one wall plate while the lid part remains fixed to the side of the housing, and accordingly discharge gas in the battery case through the facing gap and the gas discharge port, wherein the at least one wall plate where the gas discharge mechanism is provided is an attaching part to an equipment object to which the battery case is provided, and the wall plate is attached so that when the wall plate is deformed to swell outward by the internal pressure, a restriction member on a side of the equipment object restricts the amount of swelling.

8. The battery case according to claim 7, wherein a plurality of the gas discharge mechanisms is provided to the at least one wall plate, and the amount of opening of the gas discharge port, which is restricted by the restriction member, is different depending on a place where each gas discharge mechanism is disposed.

9. A vehicle or a stationary energy storage device comprising the battery case according to claim 1.

10. The battery case according to claim 6, wherein a member that is provided on the side of the housing and is stronger than the at least one wall plate also serves as the lid part, or a frame member of the housing also serves as the lid part.

11. The battery case according to claim 6, wherein the lid part is a lid member that is fixed to a member that is provided on the side of the housing and is stronger than the at least one wall plate, or a lid member that is fixed to a frame member of the housing.

12. The battery case according to claim 6, wherein a sealing material is interposed between opposing surfaces of the lid part and the at least one wall plate.

13. The battery case according to any one of claim 6, wherein the at least one wall plate where the gas discharge mechanism is provided is an attaching part to an equipment object to which the battery case is provided, and the wall plate is attached so that when the wall plate is deformed to swell outward by the internal pressure, a restriction member on a side of the equipment object restricts the amount of swelling.

14. The battery case according to claim 6, wherein a plurality of the gas discharge mechanisms is provided to the at least one wall plate, and the amount of opening of the gas discharge port, which is restricted by the restriction member, is different depending on a place where each gas discharge mechanism is disposed.

15. A vehicle or a stationary energy storage device comprising the battery case according to claim 6.

16. The battery case according to claim 7, wherein a member that is provided on the side of the housing and is stronger than the at least one wall plate also serves as the lid part, or a frame member of the housing also serves as the lid part.

17. The battery case according to claim 7, wherein the lid part is a lid member that is fixed to a member that is provided on the side of the housing and is stronger than the at least one wall plate, or a lid member that is fixed to a frame member of the housing.

18. The battery case according to claim 7, wherein a sealing material is interposed between opposing surfaces of the lid part and the at least one wall plate.

19. The battery case according to claim 7, wherein a plurality of the gas discharge mechanisms is provided to the at least one wall plate, and the amount of opening of the gas discharge port, which is restricted by the restriction member, is different depending on a place where each gas discharge mechanism is disposed.

20. A vehicle or a stationary energy storage device comprising the battery case according to claim 7.

* * * * *